United States Patent [19]
Fujimoto

[11] Patent Number: 5,864,779
[45] Date of Patent: Jan. 26, 1999

[54] STRICT RECOGNIZING APPARATUS USING OBSERVATION POINT

[75] Inventor: Katsuhito Fujimoto, Kanagawa, Japan

[73] Assignee: Fujitsu Limited, Kanagawa, Japan

[21] Appl. No.: 758,310

[22] Filed: Dec. 3, 1996

[30] Foreign Application Priority Data

Feb. 29, 1996 [JP] Japan ................................. 8-043419

[51] Int. Cl.⁶ .......................... G06K 9/36; G06F 15/332
[52] U.S. Cl. ........................ 702/179; 702/150; 382/168; 382/178; 382/181; 382/190; 382/281
[58] Field of Search ..................... 364/556, 559, 364/560, 561; 382/155, 168, 170, 171, 172, 181, 190, 195, 281, 286, 288, 291, 307; 358/462, 467; 395/93; 345/418; 348/129, 130, 135, 161; 702/179, 150, 180

[56] References Cited

U.S. PATENT DOCUMENTS

| | | | |
|---|---|---|---|
| 5,111,516 | 5/1992 | Nakano et al. | 382/14 |
| 5,214,721 | 5/1993 | Fukuhara et al. | 382/56 |
| 5,247,590 | 9/1993 | Fukuhara et al. | 382/56 |
| 5,263,098 | 11/1993 | Horikami | 382/48 |
| 5,351,310 | 9/1994 | Califano et al. | 382/22 |
| 5,444,791 | 8/1995 | Kamada et al. | 382/190 |
| 5,606,629 | 2/1997 | Shirakawa | 382/203 |
| 5,625,702 | 4/1997 | Kamada et al. | 382/107 |
| 5,638,465 | 6/1997 | Sano et al. | 382/281 |
| 5,684,886 | 11/1997 | Kamada et al. | 382/107 |

OTHER PUBLICATIONS

Califano et al., "Multidimensional Indexing for Recognizing Visual Shapes", IEEE Transactions on Pattern Analysis and Machine Intelligence, pp. 373–392, Apr.1994.

D.H. Ballard; Generalizing the Hough Transform to Detect Arbitrary Shapes; Pattern Recognition, vol. 13. No.2, pp. 111–122, 1981, (unknown month).

Primary Examiner—Louis M. Arana
Assistant Examiner—Patrick Assouad
Attorney, Agent, or Firm—Armstrong, Westerman, Hattori, McLeland & Naughton

[57] ABSTRACT

A recognizing apparatus for estimating an environment description parameter, and substantially reducing a memory capacity required to represent a parameter space. The recognizing apparatus stores a restricted parameter space as a parameter space restricted by predetermined observation point information and based on an object model as shape information. The apparatus votes for a parameter subset consistent with the object model for each characteristic point obtained through environment observation in a restricted parameter space. The apparatus then outputs an estimated value for a environment description parameter according to the result of the voting for the restricted parameter space.

10 Claims, 23 Drawing Sheets

STRICT RECOGNIZING APPARATUS USING OBSERVATION POINT

BACKGROUND OF THE INVENTION

1. Field of the Invention

The present invention relates to a strict recognizing apparatus for recognizing, for example, the center of gravity of an object existing in the environment for use in a document structure interpreting process, in operating an object through a manipulator, and in the navigation of a movable robot, etc.

The present invention also relates to a strict recognizing apparatus for storing the shape information about objects and graphics as object models, and estimating a parameter describing the environment, for example, an object existing in the environment, type of graphics and position-and-postures, etc. based on the characteristic points obtained by observing the environment.

2. Description of the Related Art

Recently, the appliances provided with the above-described recognizing apparatus have been widely used, and the environment in which these appliances are operated has been improved not only in fixed areas but also the areas that are under development and have uncertain conditions. Therefore, a strict recognizing apparatus capable of correctly recognizing an object even in an uncertain environment is earnestly expected to play an important part as a component of the appliances.

A typical example of a strict recognizing apparatus capable of correctly recognizing an object especially in an environment full of different types of noise is a strict recognizing apparatus based on a generalized Hough transform, as described below from D. H. Ballard, "Generalizing the Hough Transform to Detect Arbitrary Shapes", Pattern Recognition, Vol. 13, No. 2, pp. 111–122 (1981).

FIG. 1 is a block diagram showing the basic configuration of the conventional strict recognizing apparatus, that is, the strict recognizing apparatus based on the generalized Hough transform. In FIG. 1, the conventional recognizing apparatus comprises an object model storing unit 101 storing the shape object about one or more objects; a parameter space storing unit 102 for storing the space of a parameter describing an environment; a voting unit 103 for taking a vote in a voting space in a parameter space, for example, as a parameter space segmented in a mesh form based on a characteristic point extracted from, for example, image data, that is, one or more observed characteristic points, and an object model stored in the object model storing unit 101; and a parameter estimating unit 104 for outputting an estimated value for the parameter from a voting value obtained in the voting space.

FIG. 2 is a flowchart showing the parameter estimating method in the recognizing apparatus shown in FIG. 1. When the process starts as shown in FIG. 1, a subset in the parameter space matching the object model in each of the observed characteristic points is obtained in response to the input of the set of one or more observed characteristic points obtained by observing the environment in step S101. Then, a vote is cast for the subset. Then, in step S102, the parameter describing the environment, for example, the position of the coordinates of the center of gravity of an object, etc. is estimated from the voting value obtained in the parameter space, thereby terminating the process.

The conventional operations of the recognizing apparatus explained by referring to FIG. 2 are described further in detail. FIG. 3 shows the document containing a plurality of two-dimensional graphics. The operation of the recognizing apparatus is described below using this document as an environment to be recognized.

FIG. 4 shows an example of an object model stored in the object model storing unit 101 shown in FIG. 1. Although the object model storing unit 101 normally stores models of a plurality of objects, FIG. 4 shows one of them, that is, an object model of a heart-shaped two-dimensional figure. The object model storing unit 101 stores, as the shape information about this object model, the positions of the black dots at predetermined intervals on the outline of the heart-shape.

Assume that, using the document shown in FIG. 3, an estimated value is output with the center of gravity of the heart-shaped figure set as the parameter describing the environment. Using the image data for the document shown in FIG. 3, for example, an edge is extracted to binarize data and obtain as observed characteristic points the positions of the outline points forming part of the two-dimensional figure. FIG. 5 shows such observed characteristic points. In this example, the outline points corresponding to the heart-shaped mark and the circle-shaped mark are obtained as observed characteristic points.

Assuming that A, B, C, and D are examples of the observed characteristic points shown in FIG. 5, it is uncertain that these four points respectively correspond to which outline points of the heart-shaped mark in the document shown in FIG. 3 in the steps where these observed characteristic points are obtained. In this case, A, B, and C are outline points of the heart-shaped mark. They are shown in FIG. 5.

As described above, the position of the center of gravity of the heart-shaped mark is estimated as a parameter. Then, the position of the center of gravity corresponding to the outline points is obtained when the four observed characteristic points A, B, C, and D match the points on the outline of the object model shown in FIG. 4. When one observed characteristic point sequentially shifts on the outline of the heart-shaped mark, the locus of the center of gravity is obtained as shown in FIG. 6.

The locus of the center of gravity corresponding to one observed characteristic point indicates an inverted heart-shaped mark obtained by setting upside down the object model shown in FIG. 4. Thus, four inverted heart-shaped marks are drawn on the xy plane about the observed characteristic points A, B, C, and D.

In FIG. 6, the inverted heart-shaped mark corresponding to the outline point D of the circle-shaped mark shown in FIG. 31 does not share common intersections with the three other heart-shaped marks because the observed characteristic point D does not exist on the heart-shaped mark whose value of the center of gravity is estimated there. On the other hand, the three inverted heart-shaped marks corresponding to other observed characteristic points A, B, and C cross at one point (black dot in FIG. 6) which indicates a true center of gravity as an estimated value. To obtain the parameter estimated value, the xy plane is segmented in a mesh form. When an inverted heart-shaped mark crosses a segment of the mesh, the number of votes for the segment is incremented by 1. Thus, votes are cast for the segments of the mesh corresponding to the three inverted heart-shaped marks. When a point obtains three votes, it is output as the center of gravity, that is, the parameter estimated value, of the heart-shaped mark in the document shown in FIG. 3.

As described above, a parameter, that is, the position of the center of gravity of the heart-shaped mark in the document, on the xy plane as shown in FIG. 6 is obtained by segmenting an area, that is, a parameter space, where the center of gravity is assumed to exist is segmented in a mesh form as a voting space. An estimated value of the parameter is obtained by casting a vote for the voting space. To obtain the position of the center of gravity with precision, the area should be segmented in a fine mesh form, thereby requiring a large memory capacity to represent the voting space, that is, the parameter space.

For example, when a heart-shaped mark is written on a document page of 100 mm long and 100 mm wide and its center of gravity is to be obtained with a precision of 0.1 mm, the parameter space should be segmented in a 1,000× 1,000 mesh form, and memory area is required for the number of segments. The larger the document, or the greater the desired precision of the position of the center of gravity, the larger is the memory capacity requirement. Under such conditions, it is difficult to successfully realize a practical recognizing apparatus.

SUMMARY OF THE INVENTION

The present invention is directed toward providing a strict recognizing apparatus capable of reducing the requirements of memory for use in representing a parameter space and of estimating a parameter with high precision.

DETAILED DESCRIPTION OF THE PREFERRED EMBODIMENTS

Figure 7:
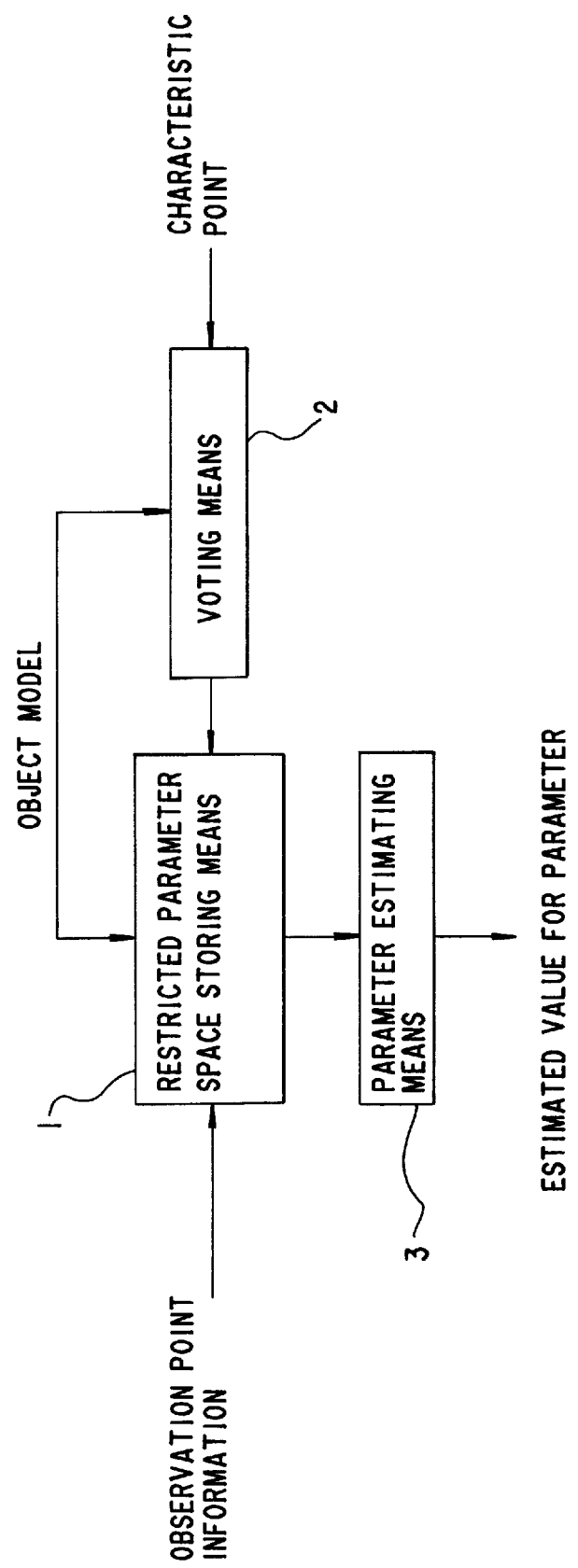
FIG. 7 is a block diagram of the configuration showing the principle of the recognizing apparatus according to the present invention.

FIG. 7 is a block diagram showing the principle of the recognizing apparatus according to the present invention. FIG. 7 shows the strict recognizing apparatus using an observation point for estimating a parameter describing an environment, for example, the position of the center of gravity of a two-dimensional figure in a document, using a set of characteristic points obtained by observing the environment and an object model implying shape information of an object assumed to exist in the environment.

In FIG. 7, a restricted parameter space storing means 1 stores a restricted parameter space as a parameter space based on an object model. The restricted parameter space is restricted by the observation point information preliminarily provided for the parameter space describing the environment. The observation point information corresponds to the shape information about an object model.

A voting means 2 casts a vote for a subset of parameters in a restricted parameter space stored in the restricted parameter space storing means 1. The subset of parameters refers to a partial area in a restricted parameter space matching the object model in each of the characteristic points.

After the voting means 2 cast votes for the restricted parameter space for all characteristic points, a parameter estimating means 3 outputs an estimated value of a parameter describing the environment depending on the result of the voting for the voting space in the restricted parameter space.

In addition to the component shown in FIG. 7, the recognizing apparatus according to the present invention further comprises an object model storing means for storing the shape information about the object model. The object model storing means outputs the shape information about the object model to the restricted parameter space storing means 1 and voting means 2.

According to the present invention, an observation point is specified by the user to substantially reduce the parameter space described above in the "Description of the Related Art". The observation point is a point on the outline of a two-dimensional figure, that is, for example, the heart-shaped mark shown in any of FIGS. 3 through 6. Preliminarily providing the coordinate of the observation point considerably reduces the parameter space and a restricted parameter space can be obtained.

Figure 6:
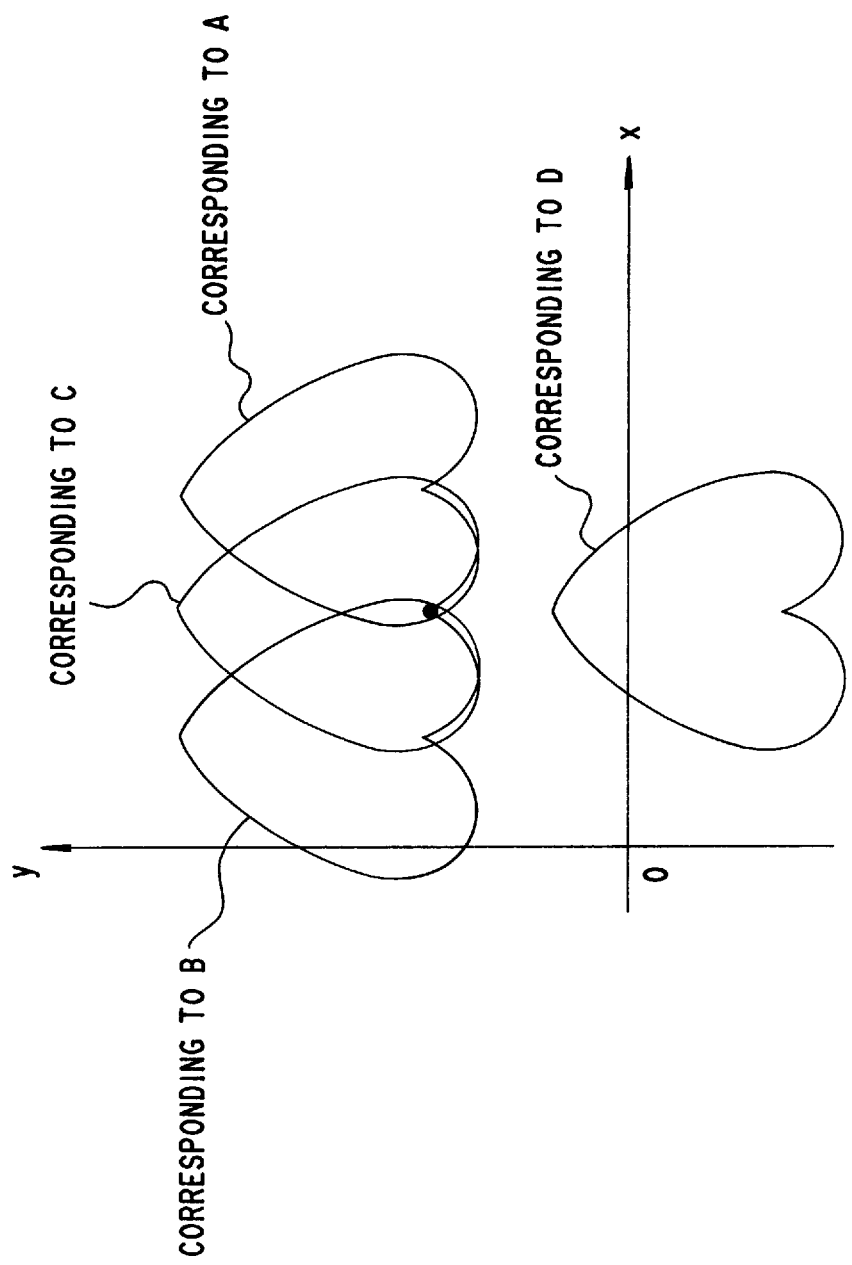
FIG. 6 shows the method of estimating the center of gravity of a heart-shaped mark shown in FIG. 5.

For example, in FIG. 6, the area is segmented in a fine mesh form to cast votes over the range of the xy plane in which inverted heart-shaped marks may appear corresponding to respective observed characteristic points.

In response to this, a point in the image is provided as an observation point to preliminarily learn that the observation point necessarily exists on a heart-shaped mark representing the position of the center of gravity. Since it is obvious that the true center of gravity exists on the inverted heart-shaped mark corresponding to the observation point as a parameter to be estimated, votes should be cast only for the positions where the inverted heart-shaped marks corresponding to other observed characteristic points cross the inverted heart-shaped mark corresponding to the observation point with the area of the inverted heart-shaped mark corresponding to the observation point set as the voting space.

As described above, the restricted parameter space, which is a parameter space to be estimated, is substantially reduced in comparison with the conventional parameter space according to the present invention. For example, in the example shown in FIG. 6, the restricted parameter space according to the present invention refers to the outline of the inverted heart-shaped mark corresponding to the observation point although the parameter space according to the prior art technology is a two-dimensional space, such as an xy-plane segmented in a mesh form. If the position of the point on the outline corresponds to the length of the outline of the heart-shaped mark, then the restricted parameter space is practically one-dimensional.

Figure 8:
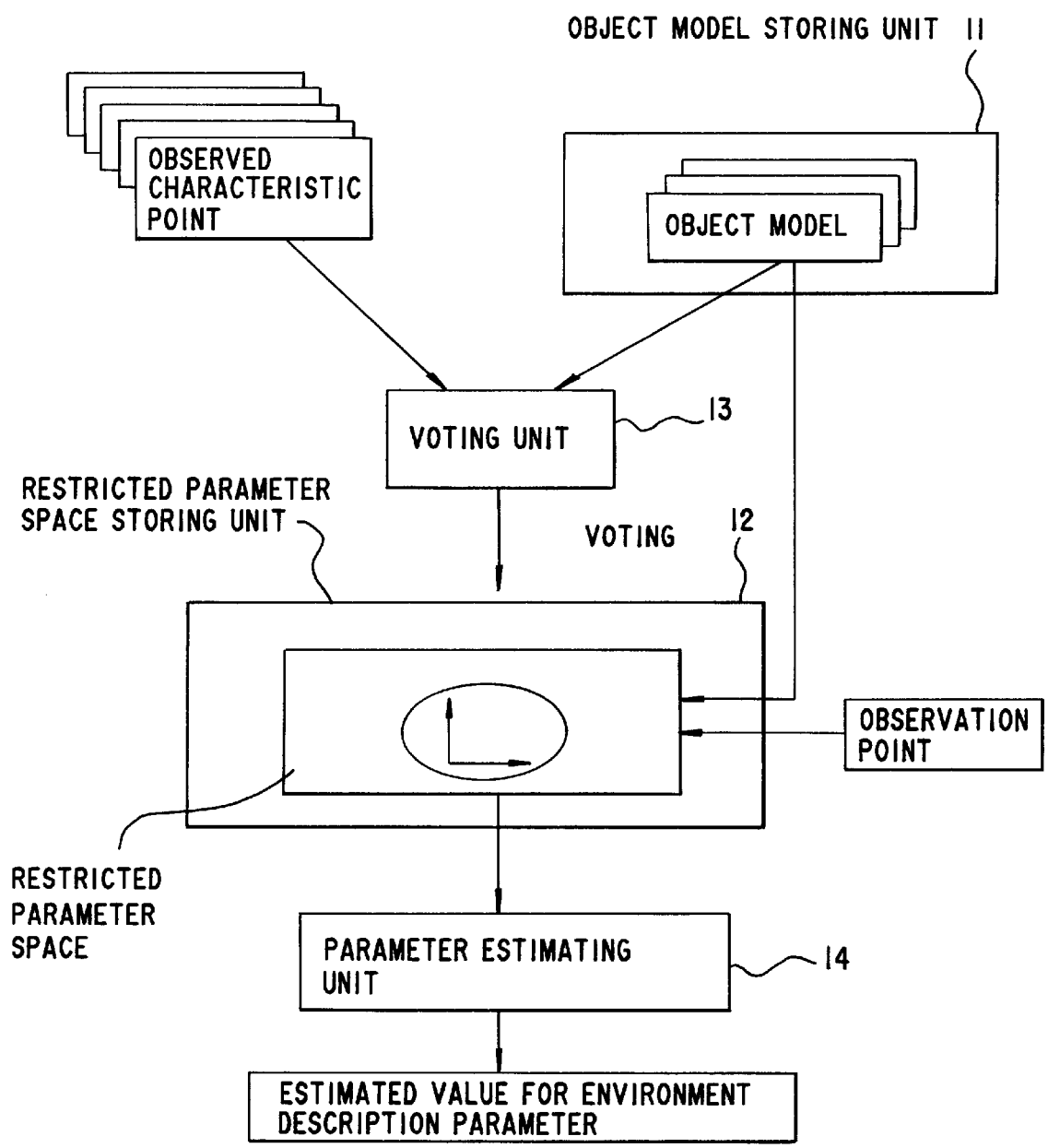
FIG. 8 is a block diagram of the basic configuration of the recognizing apparatus according to the present invention.

FIG. 8 is a block diagram showing the basic configuration of the strict recognizing apparatus according to the present invention. In FIG. 8, an object model storing unit 11 stores the shape information of objects as the object models of, normally, a plurality of objects. The shape information represents, for example, the two-dimensional coordinates obtained for the points on the outline of the heart-shaped mark at predetermined intervals.

A restricted parameter space storing unit 12 stores the restricted parameter space corresponding to the object models stored in the object model storing unit 11. The restricted parameter space is obtained by restricting the parameter space, in which the center of gravity of an object may exist, by an observation point existing on the outline of the object corresponding to the object model. The observation point is specified by, for example, the user.

A voting unit 13 casts votes for the restricted parameter space with regard to the object models stored in the object model storing unit 11 and the observed characteristic points. When the voting is completed for all observed characteristic points, a parameter estimating unit 14 outputs an estimated value of a parameter describing the environment according to the voting result for the voting space in the restricted parameter space.

Figure 9:
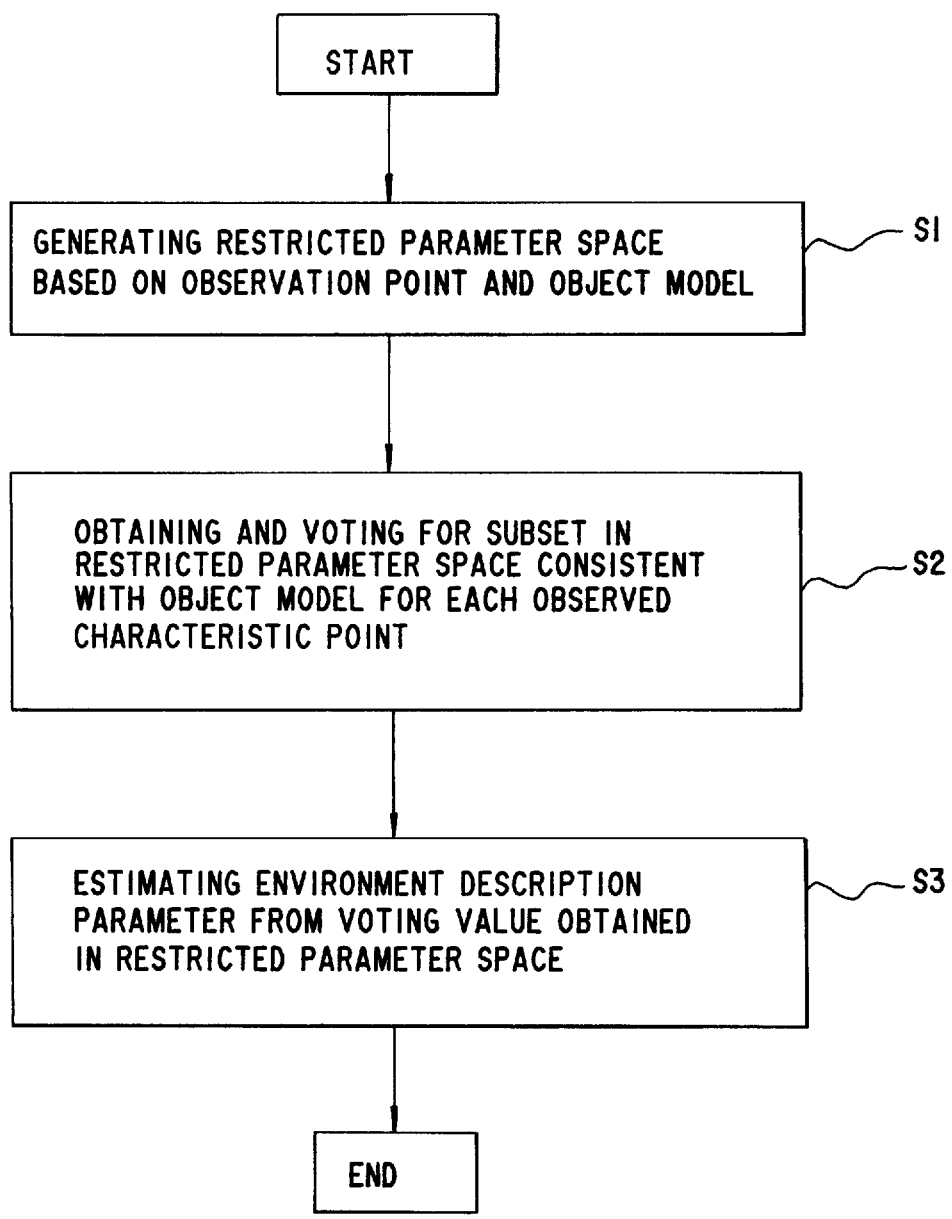
FIG. 9 is a flowchart showing the method of estimating the environment description parameter in the recognizing apparatus show in FIG. 8.

FIG. 9 is a flowchart showing the method of estimating an environment description parameter performed by the recognizing apparatus corresponding to the configuration of the recognizing apparatus shown in FIG. 8. When the process starts as shown in FIG. 8, a restricted parameter space is generated based on the observation point and object model provided in step S1. In the example shown in FIG. 6, an inverted heart-shaped mark corresponding to an observation point is generated as a restricted parameter space.

In step S2, a subset is obtained in the restricted parameter space as matching the object model in each of the observed characteristic points, and then the voting is performed. The subset is normally obtained as two intersections between the restricted parameter space generated in step S1, for example, an inverted heart-shaped mark corresponding to an observation point, and an inverted heart-shaped mark corresponding to an optional observed characteristic point.

Then in step S3, the environment description parameter, for example, the position of the center of gravity, is estimated from the voting value obtained in the restricted parameter space, and the process is terminated.

Figure 10:
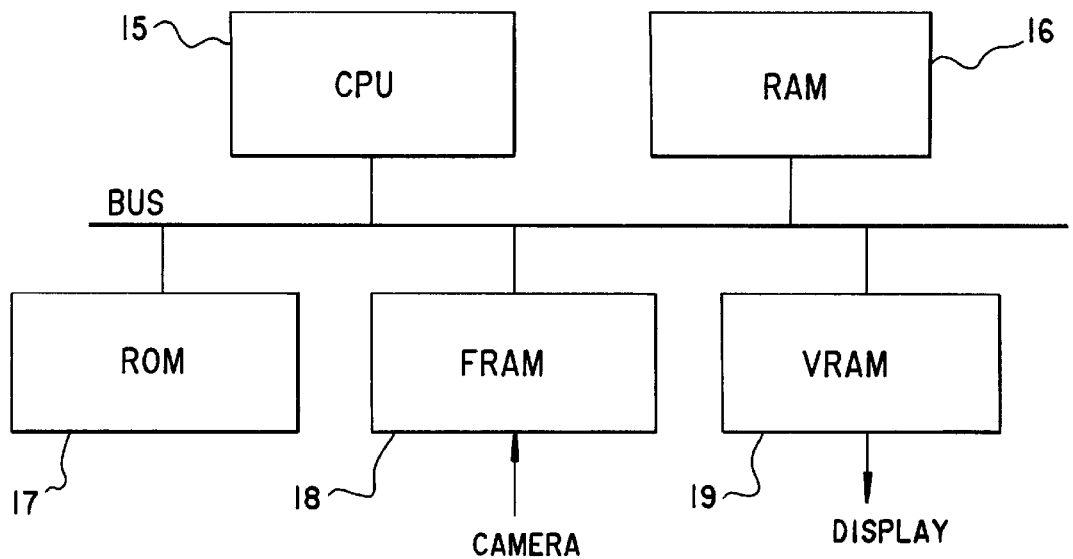
FIG. 10 is a block diagram showing the configuration of the computer system for realizing the present invention.

FIG. 10 is a block diagram showing the configuration of the computer system for realizing the present invention. In FIG. 10, the system comprises a central processing unit (CPU) 15 for controlling the entire system; a random access memory (RAM) 16 for storing the shape information about an object model and the data of restricted parameter space; a read-only memory (ROM) 17 for storing a recognizing program; a frame buffer (FRAM) 18 for storing image data captured by a camera; and a video random access memory (VRAM) 19 for storing image data when the image data obtained by, for example, coloring an estimated object is displayed on the display unit corresponding to the position and posture of the object as a result of estimating the parameter.

Figure 11:
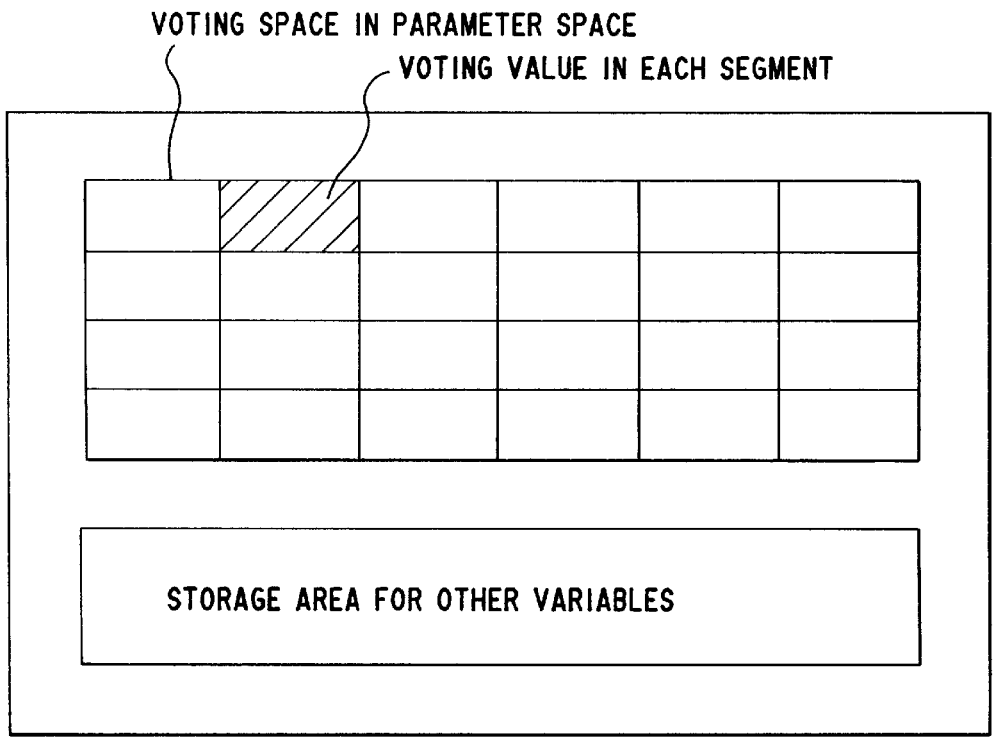
FIG. 11 shows the array as a voting space in a restricted parameter space.

FIG. 11 shows the data structure of the array data as a voting space in the restricted parameter space in the data developed on the RAM 16 shown in FIG. 10. In the memory, the array data is developed correspondingly to the respective segments of the mesh obtained by segmenting the restricted parameter space. The array element with which a vote is cast is determined based on the observation point and observed characteristic point, and the voting value corresponding to the array element is incremented by one.

Figure 1:
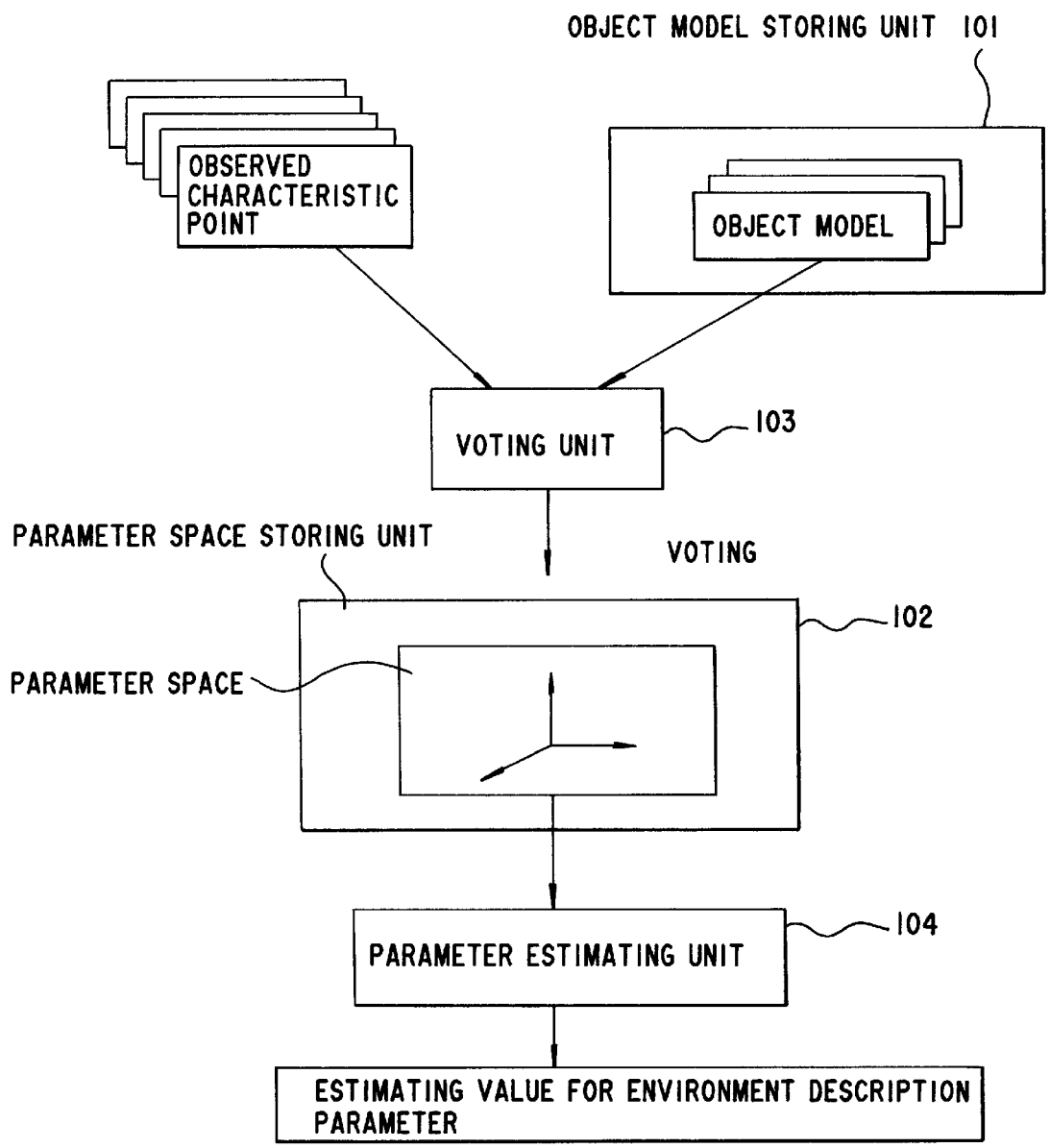
FIG. 1 is a block diagram showing the configuration of the conventional strict recognizing apparatus.
Figure 2:
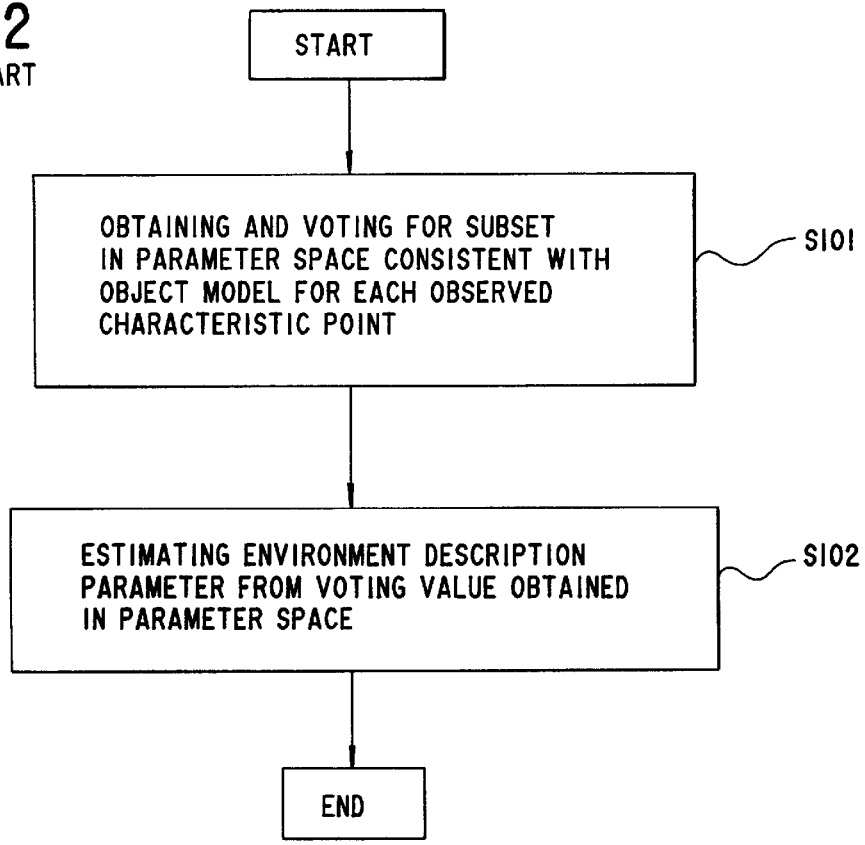
FIG. 2 is a flowchart showing the method of estimating a parameter in the recognizing apparatus shown in FIG. 1.
Figure 3:
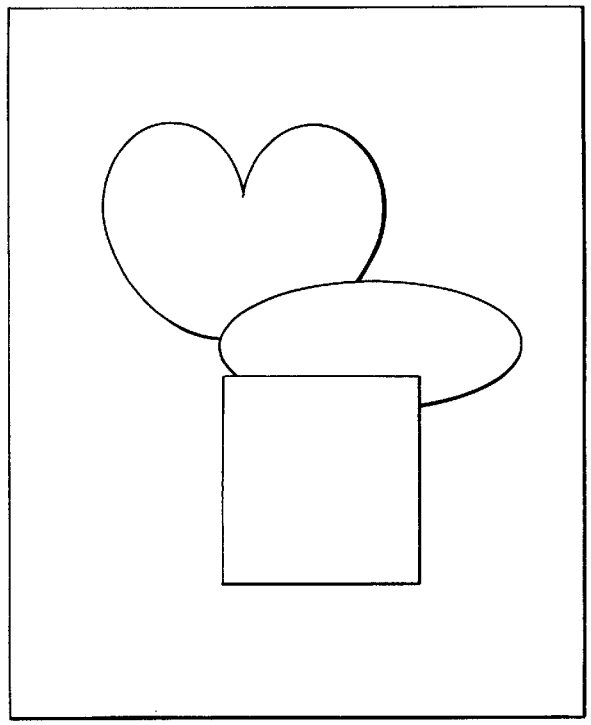
FIG. 3 shows an example of a document containing a plurality of two-dimensional figures.
Figure 4:
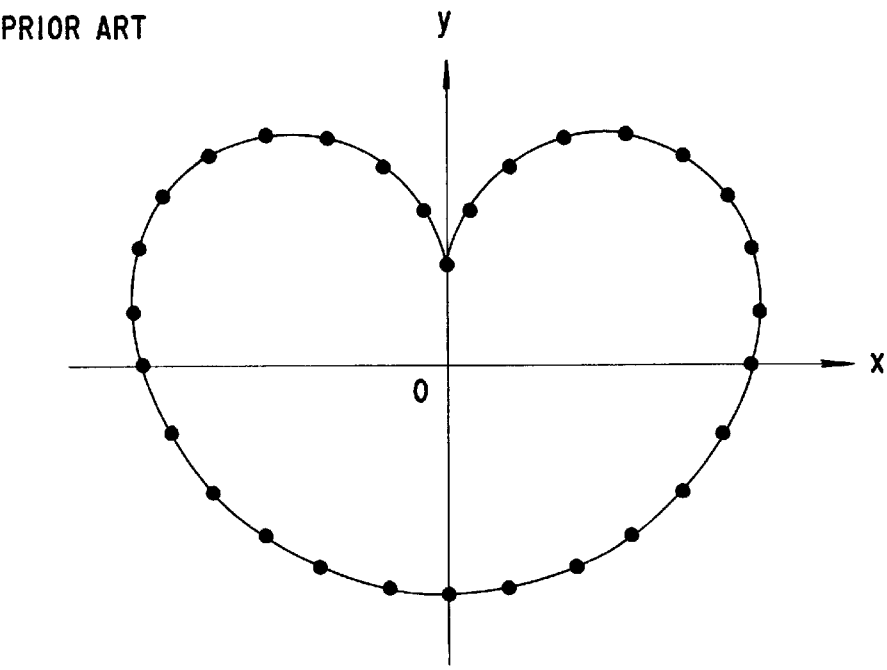
FIG. 4 shows an example of an object model.
Figure 5:
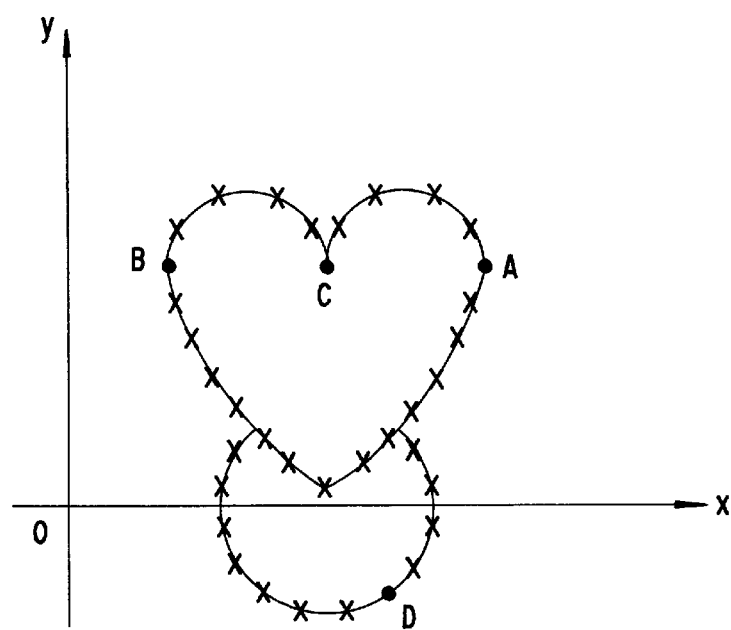
FIG. 5 shows an example of a characteristic point obtained by observing a document.
Figure 12:
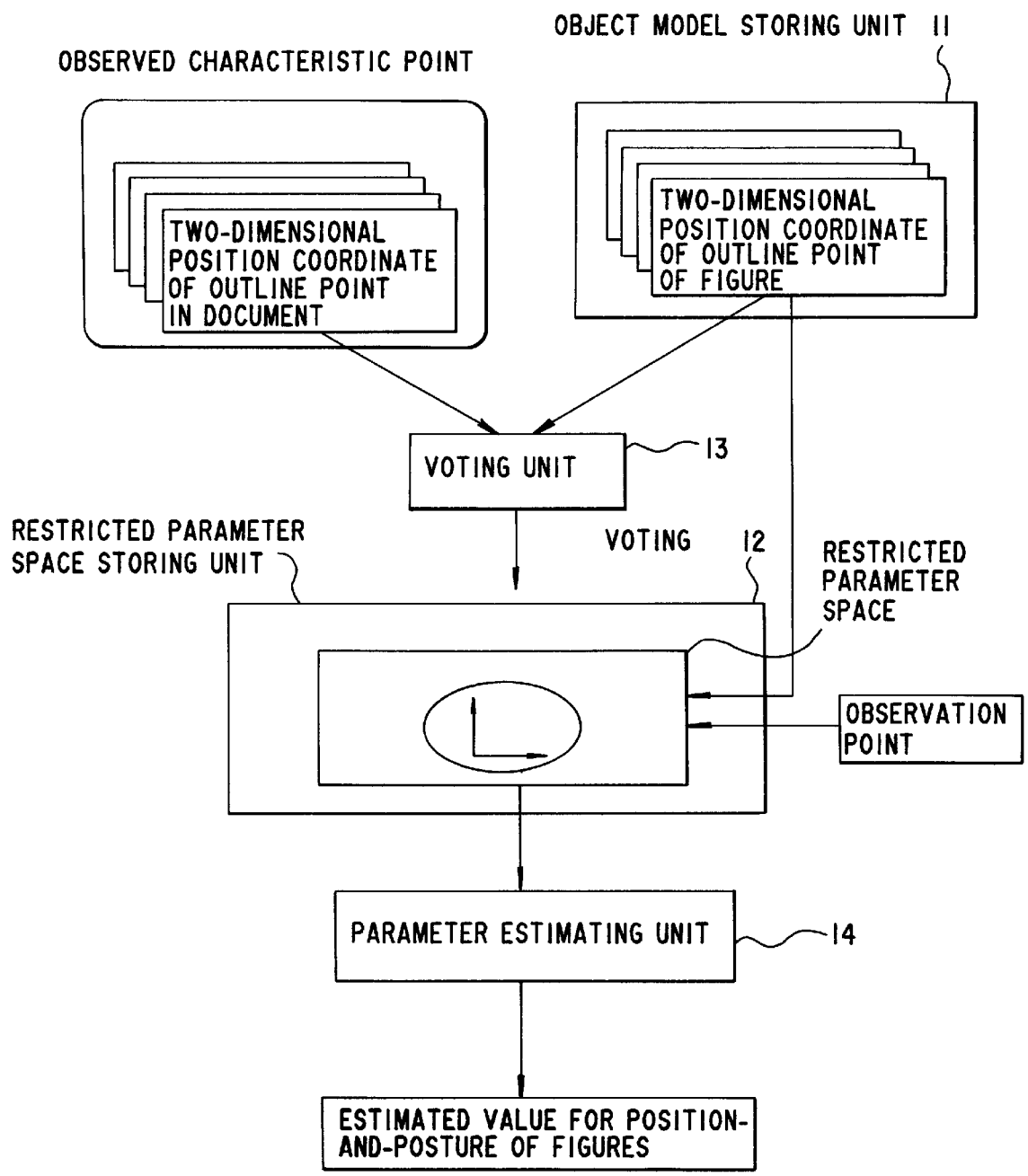
FIG. 12 is a block diagram showing the configuration of the recognizing apparatus according to the first embodiment.

Described below is a first embodiment of the present invention. FIG. 12 is a block diagram showing the configuration of the recognizing apparatus for explaining the first embodiment of the present invention. The configuration shown in FIG. 12 is different from that shown in FIG. 8 in that the object model storing unit 11 stores an object model of a two-dimensional position coordinate of the outline point of a figure, and that the observed characteristic point is a two-dimensional position coordinate of the outline point (of a figure) in a document. In the first embodiment, a two-dimensional figure contained in a document shown in FIG. 3 is recognized, and an estimated value of the position-and-posture of the figure is output as a parameter of the figure. That is, according to the first embodiment, the object model shown in FIG. 4 is stored by the object model storing unit 11 shown in FIG. 12, and the position-and-posture of the heart-shaped mark in the document shown in FIG. 3 is estimated. Thus, the heart-shaped mark can be extracted from the other graphics.

An object model is a graphic model to be detected from a document. In this example, it is represented by a set of outline points of the figure. Thus, an optional figure can be set as a model in the range of the quantization precision of the outline points. The object model M of the figure K is represented by the two-dimensional coordinates of the $N_M$ outline points of the figure K in the object model coordinate system as follows:

$$x_j^M=(x_j^M, y_j^M), (j=1 \ldots N_M) \quad (1)$$

The position-and-posture parameter of the figure K is a coordinate transformation parameter for use in transforming the object model coordinate system of the figure K into the working coordinate system virtually set in the environment, and is represented by a two-dimensional position and a one-dimensional posture as "(X, Y, Θ)".

The object of the first embodiment of the recognizing apparatus is to estimate a position-and-posture parameter for the figure K in the document. In detail, assuming that one of the outline points obtained from the document is specified as an observation point, the position-and-posture parameter of the figure K containing the observation point as a portion of the outline point is estimated.

Figure 13:
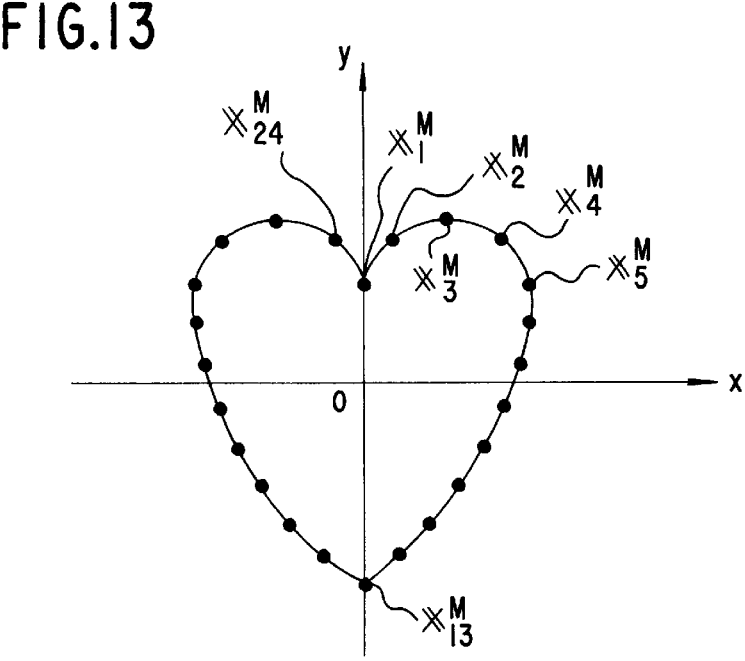
FIG. 13 shows an example of a representative point of an object model.
Figure 14:
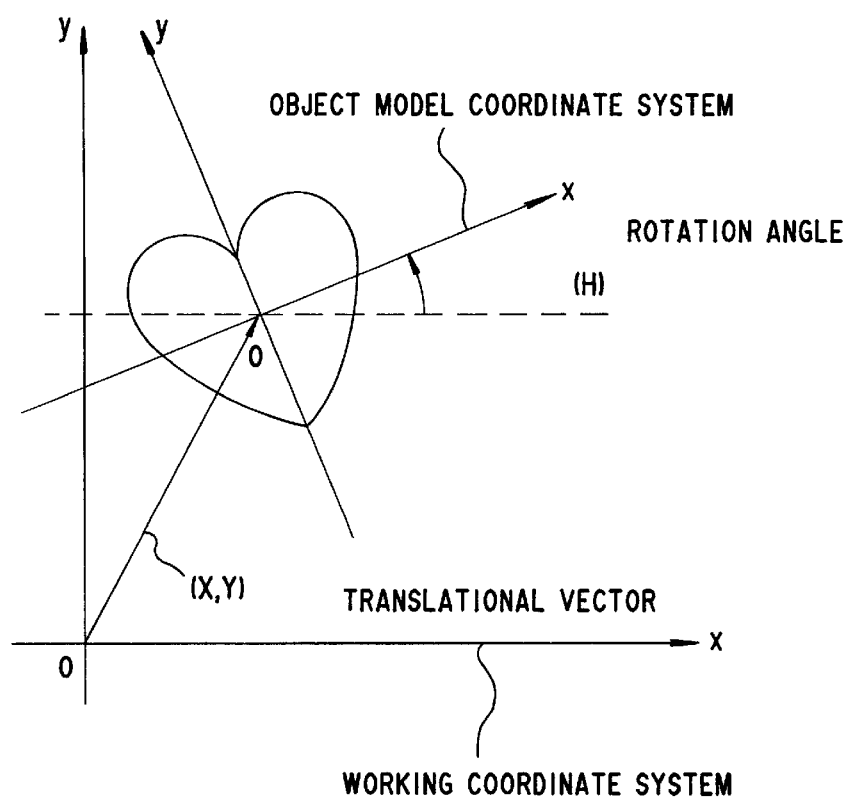
FIG. 14 shows the position-and-posture parameter of a two-dimensional figure.

An object model and its position-and-posture are described by referring to FIGS. 13 and 14. FIG. 13 shows an example of the point on the outline of a heart-shaped object model, that is, an example of a representative point. In this example, $N_M$ equals 24, and 24 representative points approximately represent the form of a heart-shaped mark. It is desired that the points on the outline of the heart-shaped mark are represented in series. However, it is normally difficult to represent an object of an optional form by, for example, an equation. Therefore, points on the outline are selected at intervals, and the selected set of points are defined as the shape information of an object, that is, the points representing the object model.

FIG. 14 shows the position-and-posture parameter of the figure K. In FIG. 14, the position-and-posture parameter of the figure in the document is represented using the x-direction component X and y-direction component Y of the parallel vector for moving the object model shown in FIG. 13, and also using the rotation angle Θ obtained as a result of the movement.

The object of the first embodiment of the recognizing apparatus is to estimate a position-and-posture parameter for the figure K in a document. According to the present invention, when one of the outline points obtained from the document is specified as an observation point, the position-and-posture parameter is estimated for the figure K containing the observation point as a portion of the outline points. That is, the range of the position-and-posture parameter of the figure K containing the observation point as an outline point is obtained, and the obtained range is a restricted parameter space.

An observed characteristic point indicates an outline point forming part of the outline of a figure, and is obtained by extracting the edge of image data in a document containing two-dimensional graphics and by binarizing the data. For example, a sobel filter is used in extracting an edge. Since the density of images indicates a sudden change at outline points, the existence of an outline point can be checked by obtaining a density change. If the unit vectors of a gray image f(x, y) in the x and y directions are vector i and vector j, the image change can be represented by the following equation:

$$\nabla f(x, y) = \frac{\partial f(x, y)}{\partial x} i + \frac{\partial f(x, y)}{\partial y} j \quad (2)$$

In a digitalized image, the level of a density change is obtained by approximating the differentiation coefficient indicating the level of a density change by a difference operation. There are several methods of approximating a difference using various difference filters. Furthermore, a new difference filter such as a sobel filter can be provided by linearly combining a smoothing filter with a difference filter. Using the sobel filter, the influence of noise can be considerably reduced when an outline point is obtained.

According to the first embodiment, the observed characteristic point is represented by the two-dimensional position coordinate, and $N_D$ observed characteristics points can be represented by the following equation using the two-dimensional coordinate in the working coordinate system set in the document:

$$x_i^D=(x_i^D, y_i^D) i=1, \ldots, N_D \quad (3)$$

Described below are the generation of a restricted parameter space and the voting by the voting unit.

The two-dimensional coordinates of the observation point indicated by vector $x^A$ in the working coordinate system set in the document are assumed to be $(x_A, y_A$ in the system.

The restricted parameter space storing unit 12 generates a restricted parameter space C in an initializing process using an object model and an observation point. The restricted parameter space C is a set of position-and-posture parameters of an object whose shape is indicated by the figure K and which contains the observation point as an outline. The relationship among the representative point (vector $x^M$) of an object model, an observation point vector $x^A$, and the representative point (vector $x^c$, θ)=($x^c$, $y^c$, $θ^c$) of the restricted parameter space C can be represented by the following equation (4) from the coordinate transform equation using the rotation matrix $R_θ$:

$$x^C=x^A-R_{θC}x^M \quad (4)$$

Assuming that $θ^C$ is quantized in the range of $[0, 2π]$ and the representative point is represented by the following equation, the restricted parameter space C can be represented by the following equation using the representative points of the object model M and the posture parameter $θ^C$:

$$θ_k^C ∈ [0, 2π] (k=1 \ldots N_θ) \quad (5)$$

$$C=\{(x^A-R_{θk}^C x_i^M, θ_k^C) | i=1 \ldots N_M, k=1 \ldots N_θ\} \quad (6)$$

Therefore, the voting space in the restricted parameter space can be discretely represented by the following two-dimensional array:

$$\{H(i,k) | i=1 \ldots N_M, k=1 \ldots N_θ\} \quad (7)$$

where $N_M$ indicates the number of the representative points of the object models, and $N_θ$ is the number of quantizations of a posture parameter.

Since the voting space is a 3-dimensional array obtained using a discrete three-dimensional position-and-posture parameter space according to the prior art technology, the memory requirements can be substantially reduced according to the present embodiment.

The voting is performed as follows by the voting unit 13 when the observed characteristic point $x_j^D=(x_j^D, y_j^D)$ is assigned.

The possible set $C_j$ of the position-and-posture parameter generated by the observed characteristic point (vector $x_j^D$) and the object model M can be represented by the following equation, as in the case of the observation point.

$$C_j=\{(x_j^D-R_{θk}^C x_i^M, θ_k^C) | i=1 \ldots N_M, k=1 \ldots N_θ\}(i=1 \ldots N^D) \quad (8)$$

The voting unit 13 votes for the intersection between the restricted parameter space C and the possible set $C_j$ by the observed characteristic point vector $x_j^D$.

An intersection is determined if the distance between representative points is compared with the quantization distance and the former is smaller than the latter. The voting process is performed after setting to the following equation the two-dimensional coordinate (i, k) representing C intersection with $C_j$:

$$H(i,k) := H(i,k)+1 \qquad (9)$$

If the voting unit 13 has completed the voting process on all observed characteristic points, the parameter estimating unit 14 selects the representative point of the restricted parameter space having the largest number of votes, and defines the position-and-posture as an estimated value of the parameter.

Figure 15:
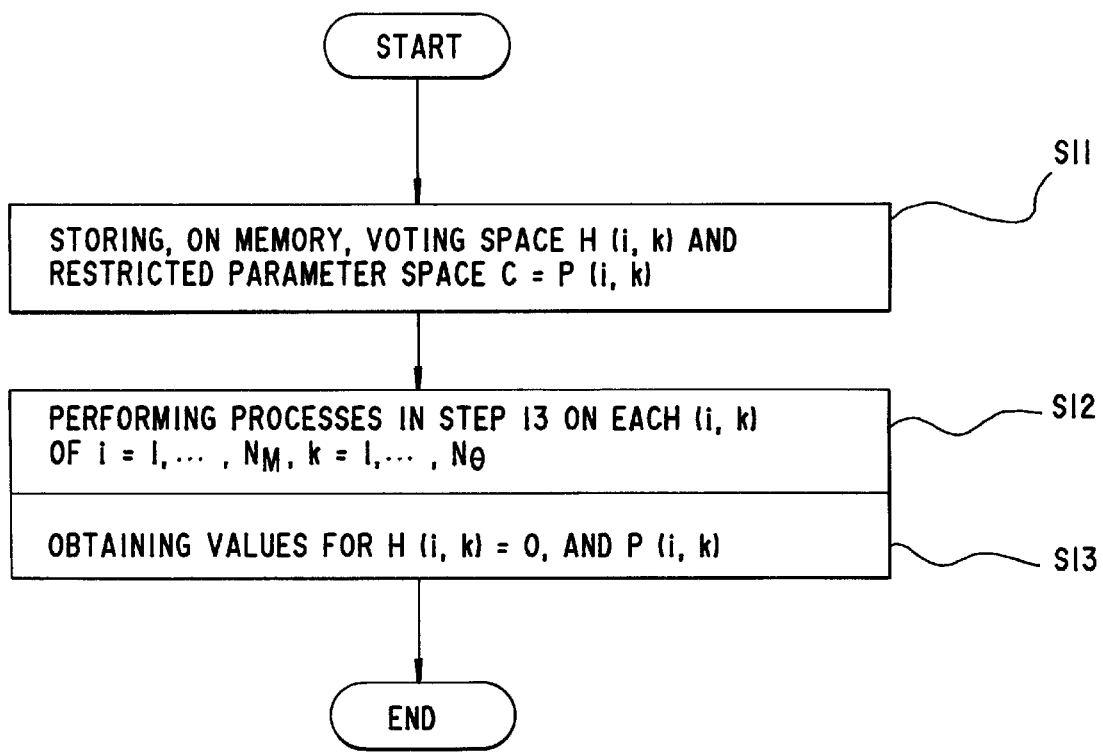
FIG. 15 is a flowchart showing the restricted parameter space generating process.

The generation of a restricted parameter space and the execution of voting are described below by referring to the flowchart. FIG. 15 is a flowchart showing the restricted parameter space generating process. When the process starts as shown in FIG. 15, the storage areas of the voting space H (i, k) and the representative point of the restricted parameter space C (hereinafter referred to as vector P (i, k)) are reserved on the memory in step S11. Generating a restricted parameter space practically refers to generating a set of a two-dimensional array H (i, k) as a voting space and a coordinate value vector P (i, k) of the representative point in the parameter space for an index (i, k), (i=1, . . ., $N_M$, k=1, . . ., $N_\theta$) as a set of values i and k. The area for the spaces is reserved on the memory in step S11.

Then, in FIG. 15, the process in step S13 is performed for the index (i, k) in step S12. In step S13, the value of the voting space H (i, k) is initialized to zero, and the value of the vector P (i, k) is obtained.

The representative vector P (i, k) of the restricted parameter space C is represented in three dimensions as described by referring to equation (6). In equation (6), $\theta_k^c$ is a representative point obtained after quantizing the one-dimensional posture parameter θ, and is computed by the following equation:

$$\theta_k^c = \frac{k-1}{N_\theta} \times 2\pi \quad (k=1, 2, \ldots, N_\theta) \qquad (10)$$

$R_\theta$ is a two-dimensional rotation matrix represented by the following equation:

$$R_\theta = \begin{pmatrix} \cos\theta & -\sin\theta \\ \sin\theta & \cos\theta \end{pmatrix} \qquad (11)$$

Using above-described equations, the vector P (i, k) can be computed as follows:

$$P(i,k) = (x^A - R_{\theta_k^c} x_i^M, \theta_k^c) \qquad (12)$$

$$= \left( \begin{bmatrix} x^A \\ y^A \end{bmatrix} - \begin{bmatrix} \cos\frac{2\pi(k-1)}{N_\theta} & -\sin\frac{2\pi(k-1)}{N_\theta} \\ \sin\frac{2\pi(k-1)}{N_\theta} & \cos\frac{2\pi(k-1)}{N_\theta} \end{bmatrix} \begin{bmatrix} x_i^M \\ y_i^M \end{bmatrix}, \frac{2\pi(k-1)}{N_\theta} \right)$$

$$= \left( x^A - x_i^M \cos\frac{2\pi(k-1)}{N_\theta} + y_i^M \sin\frac{2\pi(k-1)}{N_\theta}, y^A - x_i^M \sin\frac{2\pi(k-1)}{N_\theta} - y_i^M \cos\frac{2\pi(k-1)}{N_\theta}, \frac{2\pi(k-1)}{N_\theta} \right)$$

In equation (10), sufficient posture precision can be guaranteed by setting to a value about 100 through 1000 the dividing number Nθ for use in quantizing the posture parameter. Normally, it is desired that values between 0 and 2π are processed as a continuous number. However, the quantization is required to perform computer operations.

Figure 16:
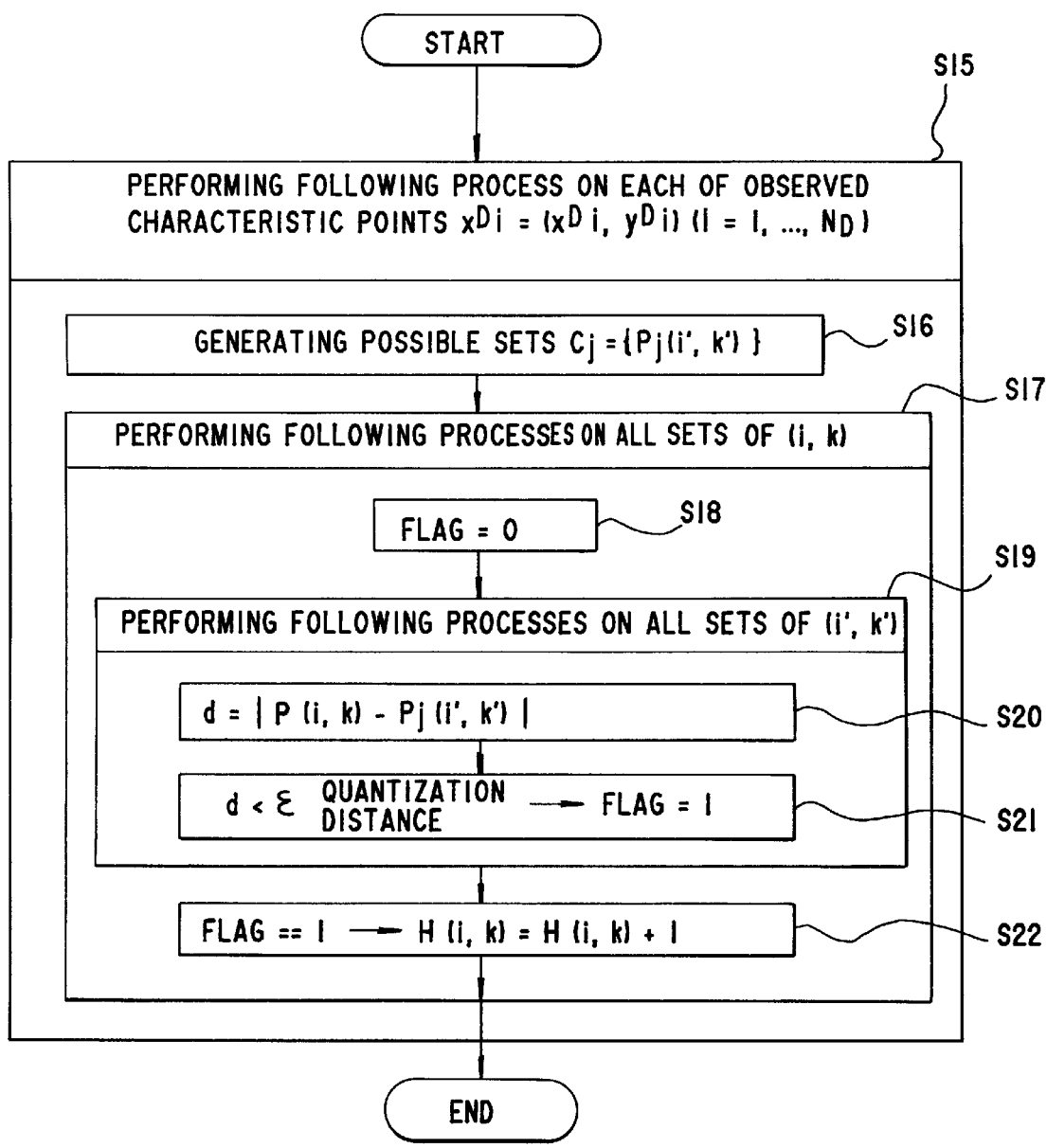
FIG. 16 is a detailed flowchart of a voting process.

FIG. 16 is a detailed flowchart indicating the voting process. When the process starts as shown in FIG. 16, the processes in steps S16 through S22 are performed on each of the observed characteristic points in step S15.

First, in step S16, a possible set $C^j$ is generated. Using the possible set, the processes in and after step S18 are performed on all indices, that is, sets of values (i, k) in step S17.

First, in step S18, the flag is set to 0, and the processes in steps S20 and S21 are performed on all sets (i', k') in step S19. In step S20, the distance between the representative vector P (i, k) in the restricted parameter space and the element of the possible set (hereinafter referred to as vector $P_j$ (i', k')) is computer. In step S21, the flag is set to 1 when the distance is smaller than the quantization distance ε. When the flag is set to 1 in step S22, the voting value H (i, k) in the voting space corresponding to the index (i, k) of the representative point in the restricted parameter space is incremented by 1, and then the process terminates.

A possible set is generated in step S16 shown in FIG. 10 as in the above-described generation of the restricted parameter space, and is obtained by the following equation:

$$P_j(i',k') = (x_j^D - R_{\theta_{k'}^c} x_i^M, \theta_{k'}^C) \qquad (13)$$

$$= \left( \begin{bmatrix} x_j^D \\ y_j^D \end{bmatrix} - \begin{bmatrix} \cos\frac{2\pi(k'-1)}{N_\theta} & -\sin\frac{2\pi(k'-1)}{N_\theta} \\ \sin\frac{2\pi(k'-1)}{N_\theta} & \cos\frac{2\pi(k'-1)}{N_\theta} \end{bmatrix} \begin{bmatrix} x_{i'}^M \\ y_{i'}^M \end{bmatrix}, \frac{2\pi(k'-1)}{N_\theta} \right)$$

$$= \left( x_j^D - x_{i'}^M \cos\frac{2\pi(k'-1)}{N_\theta} + y_{i'}^M \sin\frac{2\pi(k'-1)}{N_\theta}, y_j^D - x_{i'}^M \sin\frac{2\pi(k'-1)}{N_\theta} + y_{i'}^M \cos\frac{2\pi(k'-1)}{N_\theta}, \frac{2\pi(k'-1)}{N_\theta} \right)$$

The norm used in the computation of the distance in step S20 can be, for example, a city block distance, Euclidean distance, etc. The city block distance or Euclidean distance between the two vectors p=(p$_1$, p$_2$, p$_3$) and q=(q$_1$, q$_2$, q$_3$) can be obtained by the following equations, respectively:

$$\left. \begin{array}{l} \text{City Block Distance} = |p_1 - q_1| + |p_2 - q_2| + |p_3 - q_3| \\ \text{Euclidean Distance} = \sqrt{(p_1 - q_1)^2 - (p_2 - q_2)^2 + (p_3 - q_3)^2} \end{array} \right\} \quad (14)$$

In estimating a parameter after the voting process has been completed, the largest value H (î, k̂) is retrieved from the array H (i, k) indicating the number of votes obtained as the voting result, and the representative point P (î, k̂) of the restricted parameter space for the index (î, k̂) is output as a parameter estimated value. The quantization distance ε used in comparing the distance in step S20 is obtained by the following equation using, for example, the distance d$_M$ of the representative points of an object model and the quantization precision d$_θ$ of the posture parameter:

$$\epsilon = \sqrt{d_M^2 + d_\theta^2} \quad (15)$$

Figure 17:
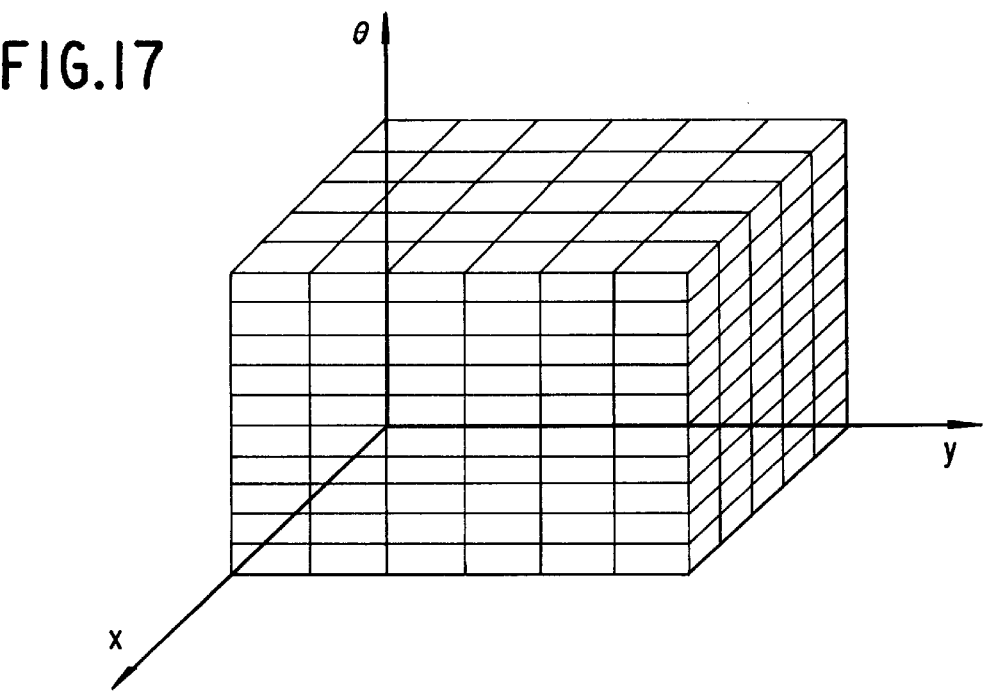
FIG. 17 shows a parameter space before restricted by an observation point.

Described below is the reduction of the memory requirements according to the first embodiment. FIG. 17 shows the three-dimensional parameter space before the restriction by the observation point, that is, the original three-dimensional parameter space. As described above, the position-and-posture parameter of a figure K according to the first embodiment is represented as a two-dimensional position (x, y) and a one-dimensional posture (θ), that is, a three-dimensional parameter space.

Figure 18:
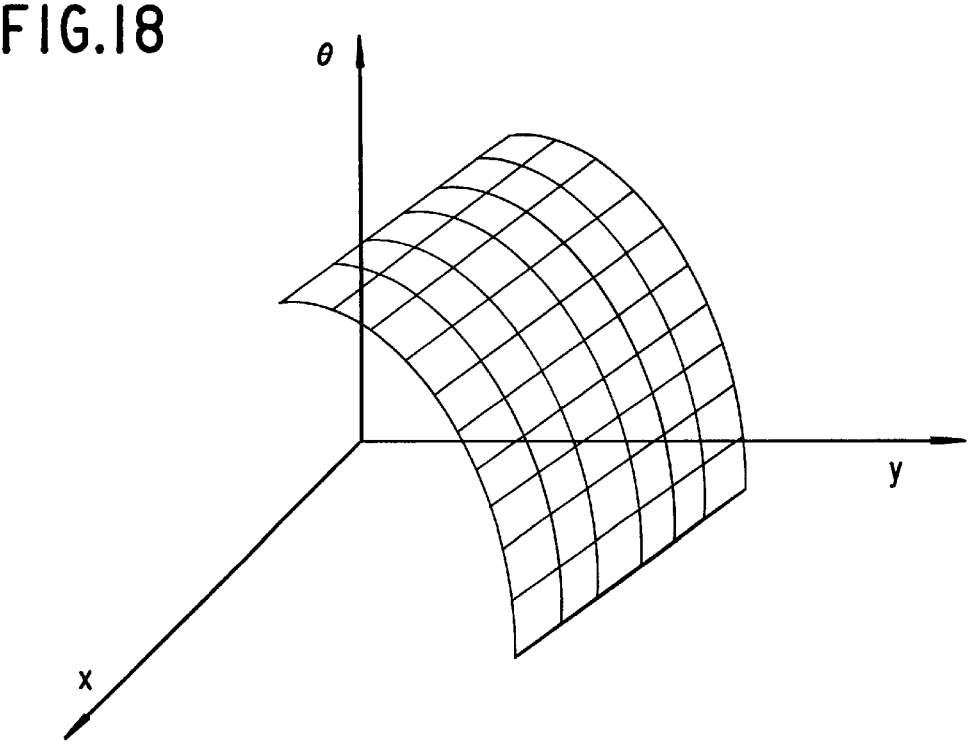
FIG. 18 shows the concept of a restricted parameter space.

FIG. 18 shows the conceptual restricted parameter space according to the first embodiment. As described above, the restricted parameter space is represented for a set of i and k as an index (i, k). Normally, it is represented by a curved surface in the coordinate space as shown in FIG. 18.

Figure 19:
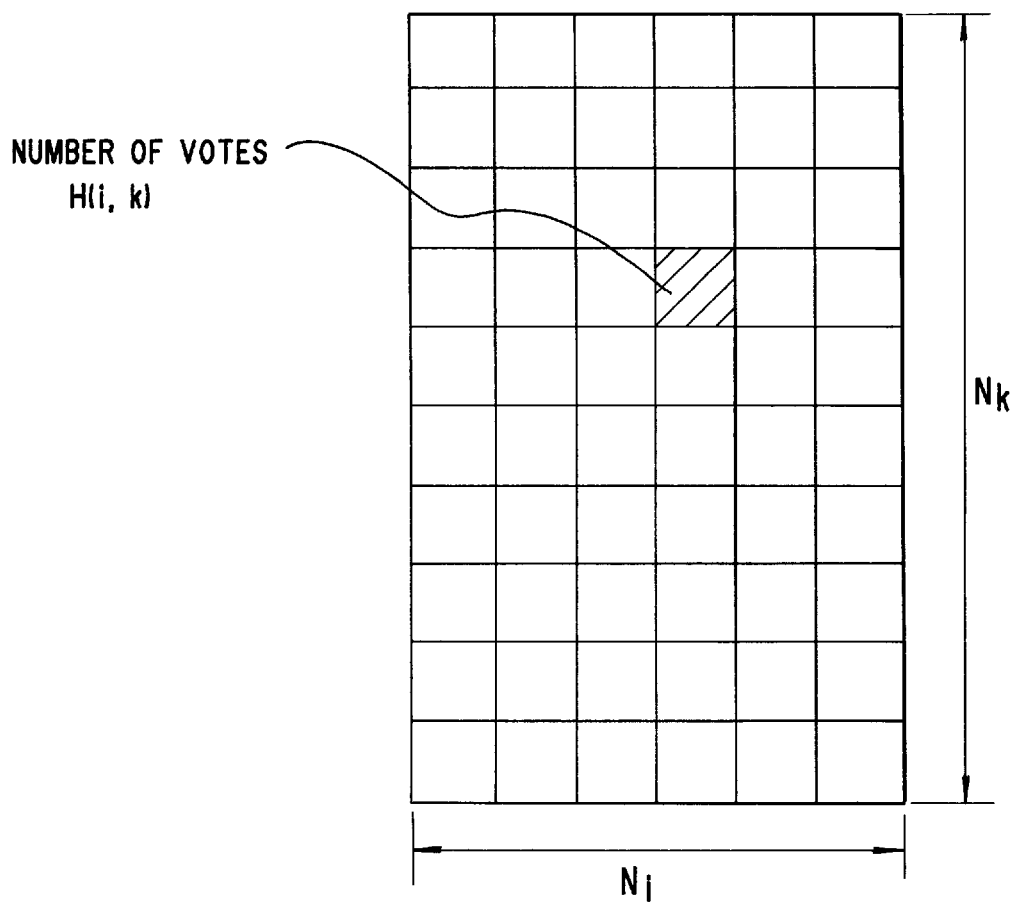
FIG. 19 shows a voting space in the restricted parameter space.

FIG. 19 shows as a plane the voting space in the restricted parameter space shown in FIG. 18. That is, the restricted parameter space in FIG. 18 is represented as a plane. The number of segments in the mesh in the voting space is N$_i$×N$_k$. The N$_i$ indicates the number of representative points of an object model, and N$_k$ indicates a quantization number of a posture parameter.

Figure 20:
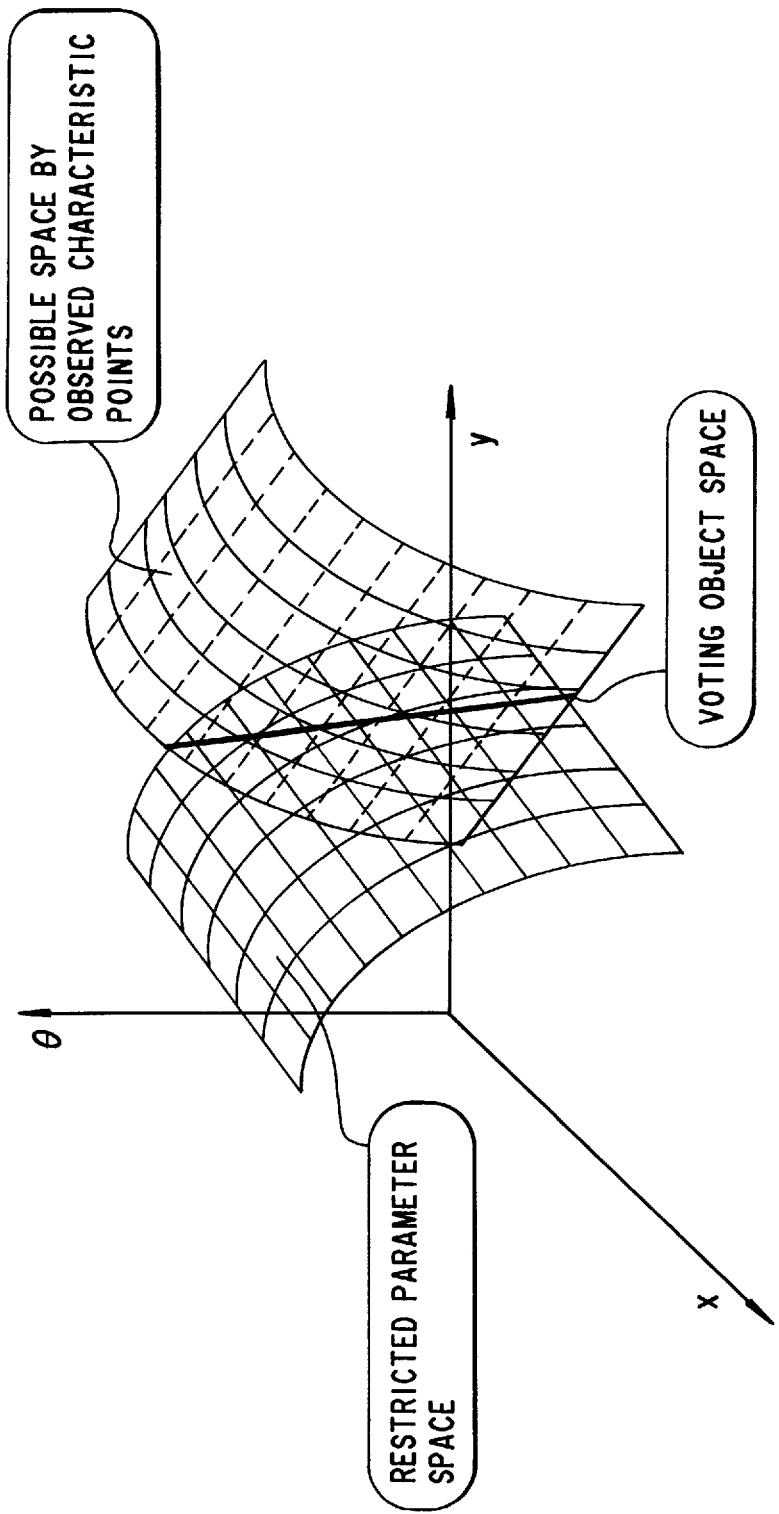
FIG. 20 shows the method of determining the position of a segment in a mesh as a voting object space.

FIG. 20 shows the method of determining the position in the mesh where votes are cast in an object voting space, that is, the voting space shown in FIG. 19. In FIG. 20, the intersection between the two-dimensional curved surface representing the restricted parameter space and the two-dimensional curved surface representing the possible space through observed characteristic points is determined as an object voting space.

Figure 21:
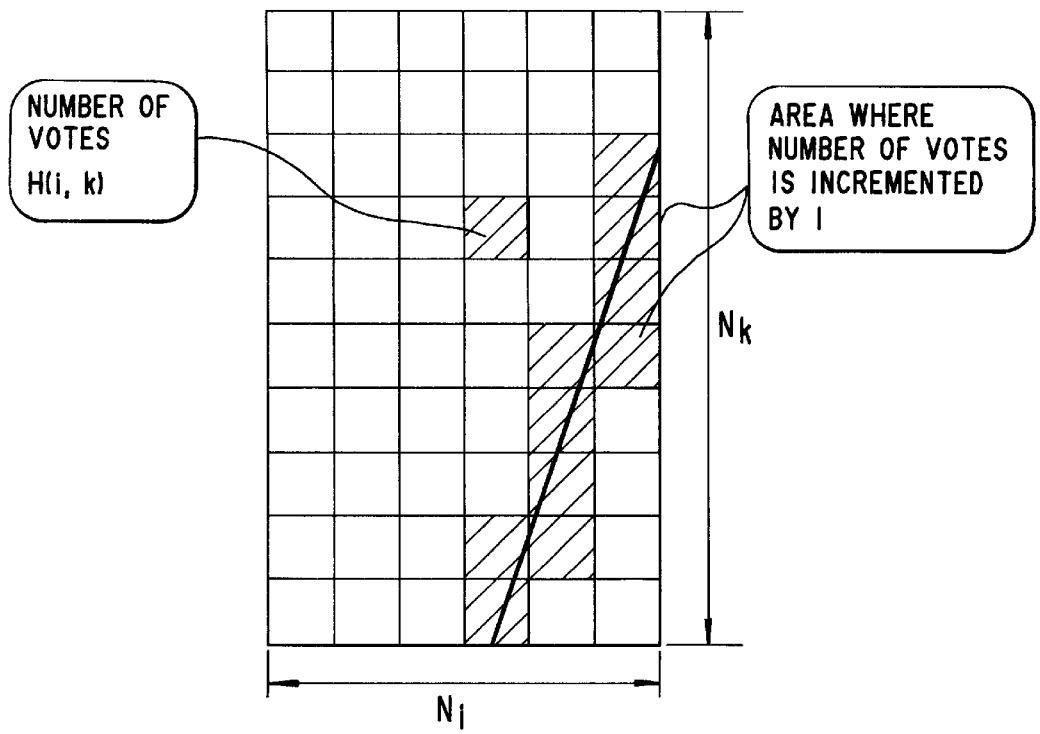
FIG. 21 shows the voting for a two-dimensional voting space.

FIG. 21 shows the vote for the two-dimensional voting space. A vote is cast for the segment corresponding to the position in the restricted parameter space intersecting with the object voting space shown in FIG. 20, that is, the possible space through the observed characteristic point.

Figure 22:
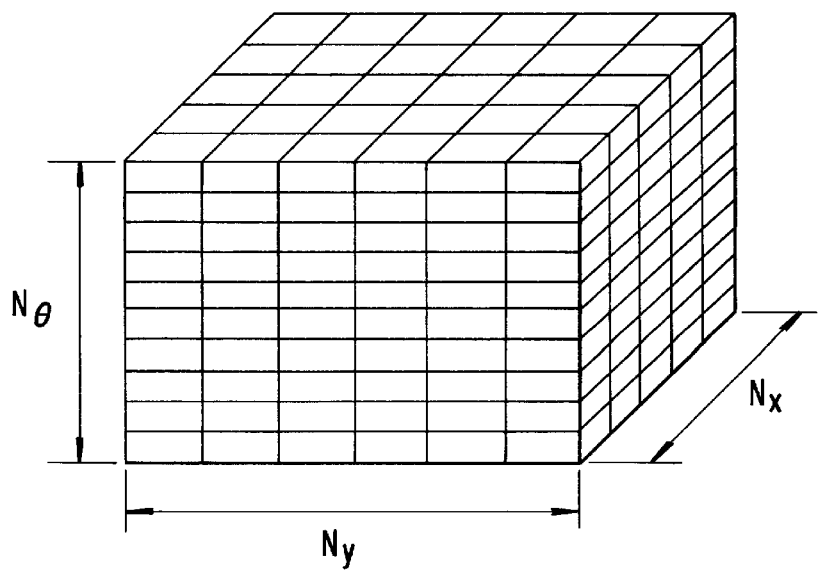
FIG. 22 shows a voting space in the prior art technology.

FIG. 22 shows the voting space according to the prior art. The voting space is obtained by segmenting the original three-dimensional parameter space shown in FIG. 17 into N$_x$×N$_y$×N$_θ$ segments of mesh. Thus, the voting space is represented in three dimensions according to the prior art while the voting space is represented in two dimensions according to the first embodiment as shown in FIG. 19. Therefore, the memory requirements can be considerably reduced according to the present invention as compared with the prior art.

Described below is the second embodiment of the present invention. According to the second embodiment, a position-and-posture parameter of a specified figure K is estimated from the document containing the two-dimensional figures as in the first embodiment. However, it is different from the first embodiment in that the outline normal of a figure is used in the second embodiment.

Figure 23:
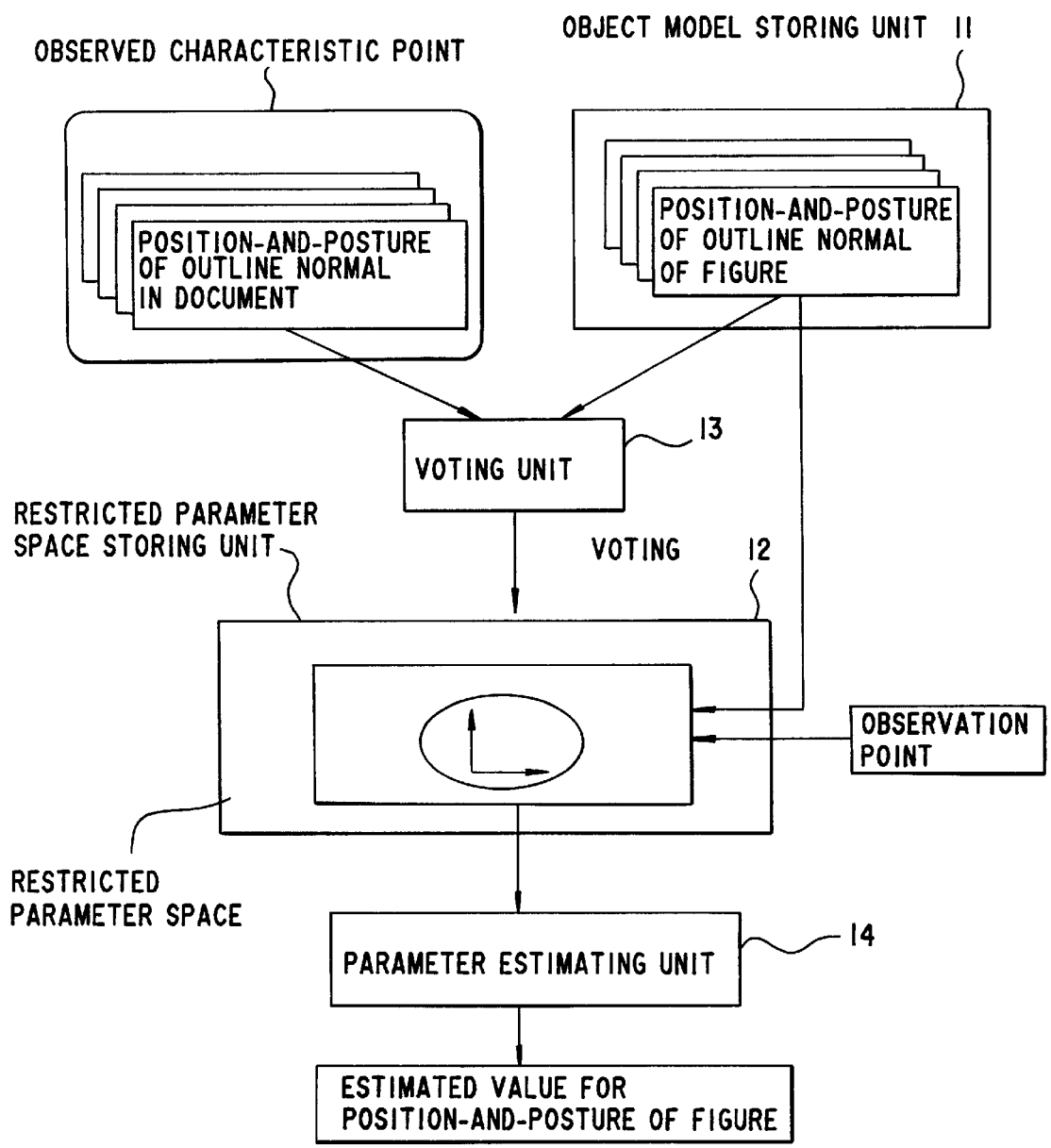
FIG. 23 is a block diagram showing the configuration of the recognizing apparatus according to the second embodiment of the present invention.

FIG. 23 is a block diagram showing the configuration of the recognizing apparatus according to the second embodiment. It differs from FIG. 12 corresponding to the first embodiment in that the shape information about the object model stored in the object model storing unit 11 is a position-and-posture of the outline normal of a figure, and that the observed characteristic point obtained from the image data is the position-and-posture of the outline normal (of the figure) in a document.

The object model according to the second embodiment is represented by a set of position-and-postures of the outline normals of a figure. Thus, the figure of an optional shape can be represented as a model in a range of the quantization precision of the outline normal. The object model M of the figure K can be represented by the two-dimensional position coordinate in the object model coordinate system of each position-and-posture and one-dimensional posture of N$_M$ outline normal of the figure K, that is, it can be represented as follows:

$$(x_j^M, \theta_j^M) = (x_j^M, y_j^M, \theta_j^M) \quad (j=1 \ldots N_M) \quad (16)$$

The position-and-posture parameter of the figure K is a coordinate transformation parameter from an object model coordinate system of the figure K to the working coordinate system virtually set in the environment, and is represented by a two-dimensional position and a one-dimensional posture, that is, represented by the elements "(X, Y, Θ)".

The object of the recognizing apparatus according to the second embodiment is to estimate the position-and-posture of the figure K located in a document. In detail, the recognizing apparatus according to the second embodiment estimates the position-and-posture parameter of the figure K containing an observation point as a portion of the outline normal after the observation point has been specified from one of the outline normals obtained from the document.

Figure 24:
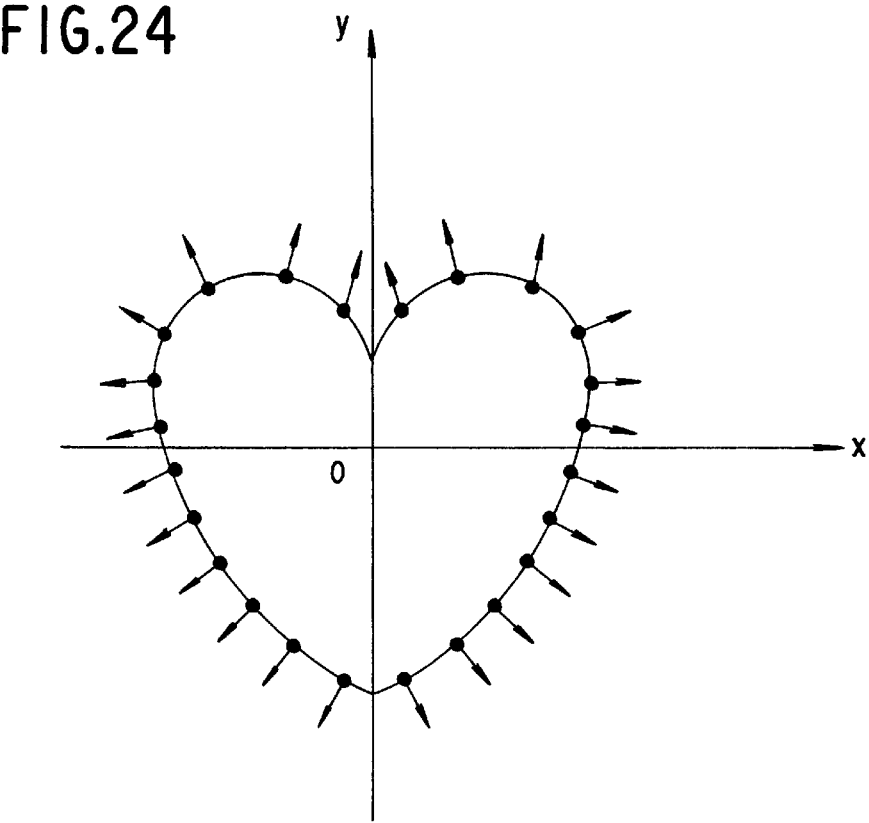
FIG. 24 shows the outline normal as an object model.

The outline normal of a figure is described below by referring to FIGS. 24 and 25. FIG. 24 shows an outline normal, as in the case shown in FIG. 13, on an outline point of a heart-shaped mark as an object. The outline normal is represented by a set of a position of the outline point and the posture of the normal at the point. The shape of the figure is represented in more detail than in the first embodiment.

As shown in FIG. 24, the outline normal extends from the representative point on the outline, and is represented geometrically as an arrow normal to the outline.

Figure 25:
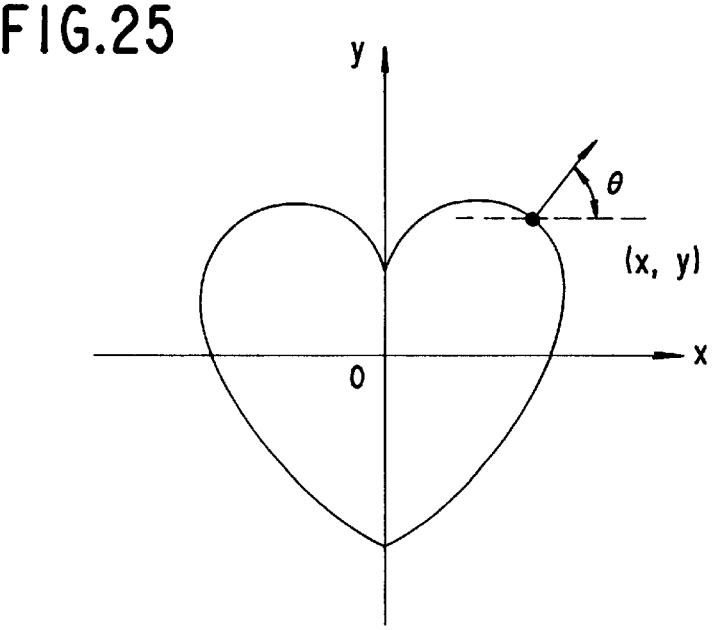
FIG. 25 shows the method of quantitatively representing an outline normal.

FIG. 25 shows the method of quantitatively representing an outline normal. In FIG. 25, using the position coordinate (x, y) in the object model coordinate system of the representative point that is the start point of the normal arrow, and the angle θ made by the normal with the x-axis direction, the outline normal is quantitatively represented by (x, y, θ).

The observed characteristic point refers to the outline normal forming part of the outline obtained by edge-extracting and binarizing a document using a sobel filter, etc. In this case, the observed characteristic point is represented by a position (two-dimensional) and posture (one-dimensional). N$_D$ observed characteristics points are represented by the following equation through the two-dimensional position coordinate in the working coordinate system set in the document and the one-dimensional posture:

$$(x_i^D, \theta_i^D) = (x_i^D, y_i^D, \theta_i^D) \quad (i=1 \ldots N_D) \quad (17)$$

The position-and-posture in the working coordinate system set in the document of the observation point vector $x^A$ is set to $(x^A, y^A, \Theta^A)$.

The restricted parameter space storing unit 12 generates a restricted parameter space C from the object model and observation point when the system is initialized. The restricted parameter space C is a set of position-and-posture parameters of an object whose shape is represented by the figure K. The relationship among the representative point vector $x^M$, observation point vector $x^A$, and the representative point of the restricted parameter space C (vector $x^C$, $\theta^C$)=($x^C$, $y^C$, $\theta^C$) is represented by the following equation using the rotation matrix $R_\theta$:

$$x^C = x^A - R_{\theta^C} x^M$$

$$\theta^C = \Theta^A - \Theta^M \ (mod\ 2\pi)$$

Therefore, the restricted parameter space C is represented by the following equation using the representative point of the object model M:

$$C = \{(x^A - R_{\theta^A - \theta_i^M} x_i^M, \Theta^A - \theta_i^M) \mid i=1 \ldots N_M\} \quad (19)$$

Therefore, the voting space in the restricted parameter space is discretely represented by the following one-dimensional array:

$$\{H(i) \mid i=1 \ldots N_M\} \quad (20)$$

where $N_M$ indicates the number of representative points of the object model.

In the prior art technology, the voting space is a three-dimensional array obtained as a discrete three-dimensional position-and-posture parameter space, which implies that the present invention has substantially reduced the memory requirements.

When provided with the observed characteristic point (vector $x_j^D$, $\theta_j^D$)=($x_j^D$, $y_j^D$, $\theta_j^D$), the voting is performed by the voting unit 13 as follows.

The possible set $C_j$ of the position-and-posture parameter formed by the observation data (vector $x_j^D$, $\theta_j^D$) and object model M can be represented by the following equation through a concept similar to that of the observation point.

$$C_j = \{(x_j^D - R_{\theta_j^D - \theta_i^M} x_i^M, \theta_j^D - \theta_i^M) \mid i=1 \ldots N_M\} \quad (21)$$

The voting unit 13 votes for the intersection between the restricted parameter space C and the possible set $C_j$ by the observed characteristic point.

The determination of the intersection is made by comparing the distance between the representative points with the quantization distance. An intersection is determined when the distance between the representative points is less than the quantization distance. A vote is cast by setting the one-dimensional coordinate (i) indicating the representative point of the C intersecting with $C_j$ to the following equation:

$$H(i) := H(i) + 1 \quad (22)$$

After the voting unit 13 has voted for all observed characteristic points, the parameter estimating unit 14 selects the representative point that has obtained the largest number of votes from among the representative points in the restricted parameter space, and defines the position-and-posture as an estimated value of a parameter.

According to the second embodiment, the voting space in the restricted parameter space is represented by the one-dimensional array H (i). On the other hand, the voting space according to the first embodiment is represented in two dimensions by H (i, k). The reason is described by referring to FIGS. 26 and 27.

According to the present invention, a possible space of a position-and-posture parameter of an object, that is, a restricted parameter space, is generated with a given observation point regarded as corresponding to one of the representative points of an object model.

Figure 26:
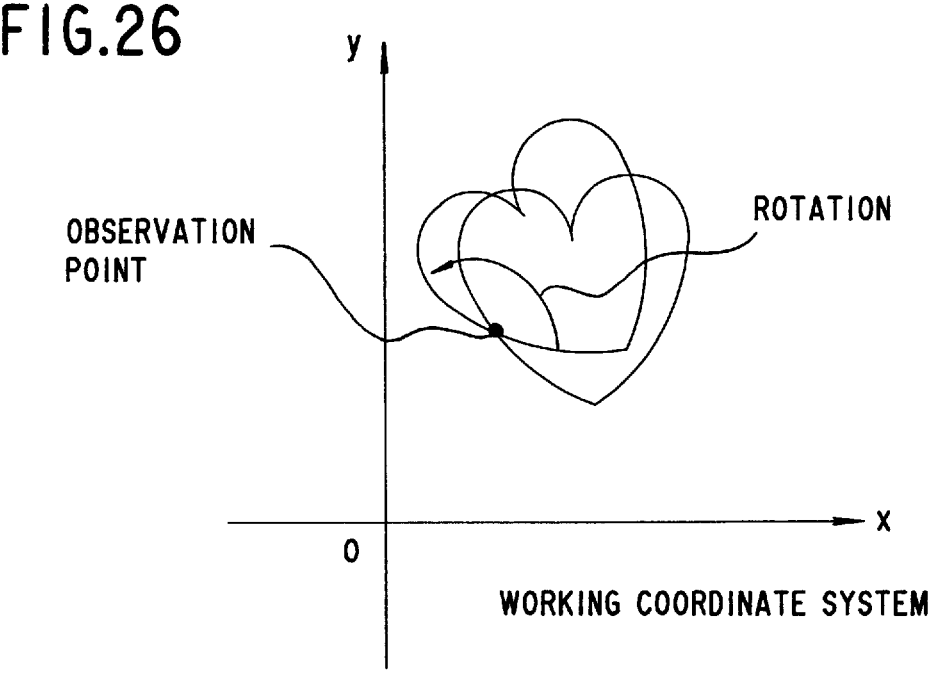
FIG. 26 shows the rotation of an object around the observation point according to the first embodiment.

In the first embodiment, since only a position is specified as an observation point, there is a freedom of a turn around the observation point as shown in FIG. 26.

Therefore, the restricted parameter space has two freedoms (i and k) that is, the freedom (i) to move a representative point and the freedom (k) to change the posture according to a turn. As a result, the restricted parameter space is represented in two dimensions, that is, a curved surface, and the corresponding voting space is also represented in two dimensions.

Figure 27:
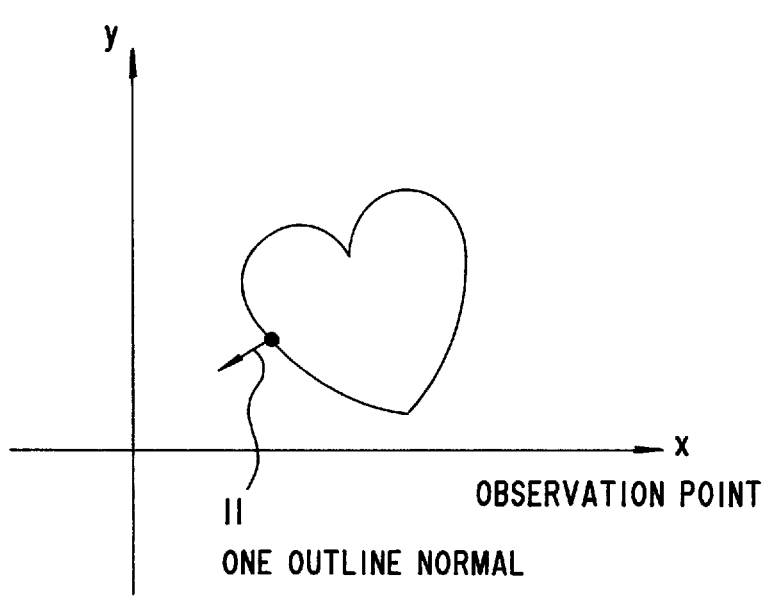
FIG. 27 shows the correspondence between the observation point and an object.

According to the second embodiment, the posture of a normal is also specified in addition to the position of a point on the outline as an observation point, that is, the information about an observation normal. Using the observation normal corresponding to the outline normal as one of the object models, the object only exists as limited to one position-and-posture in which the two normals match each other as shown in FIG. 27. Therefore, the restricted parameter space has only the freedom (i) to move a representative point, and the corresponding voting space is a one-dimensional array.

According to the second embodiment, a representative point of an object model is quantized, but a posture parameter is not quantized.

Figure 28:
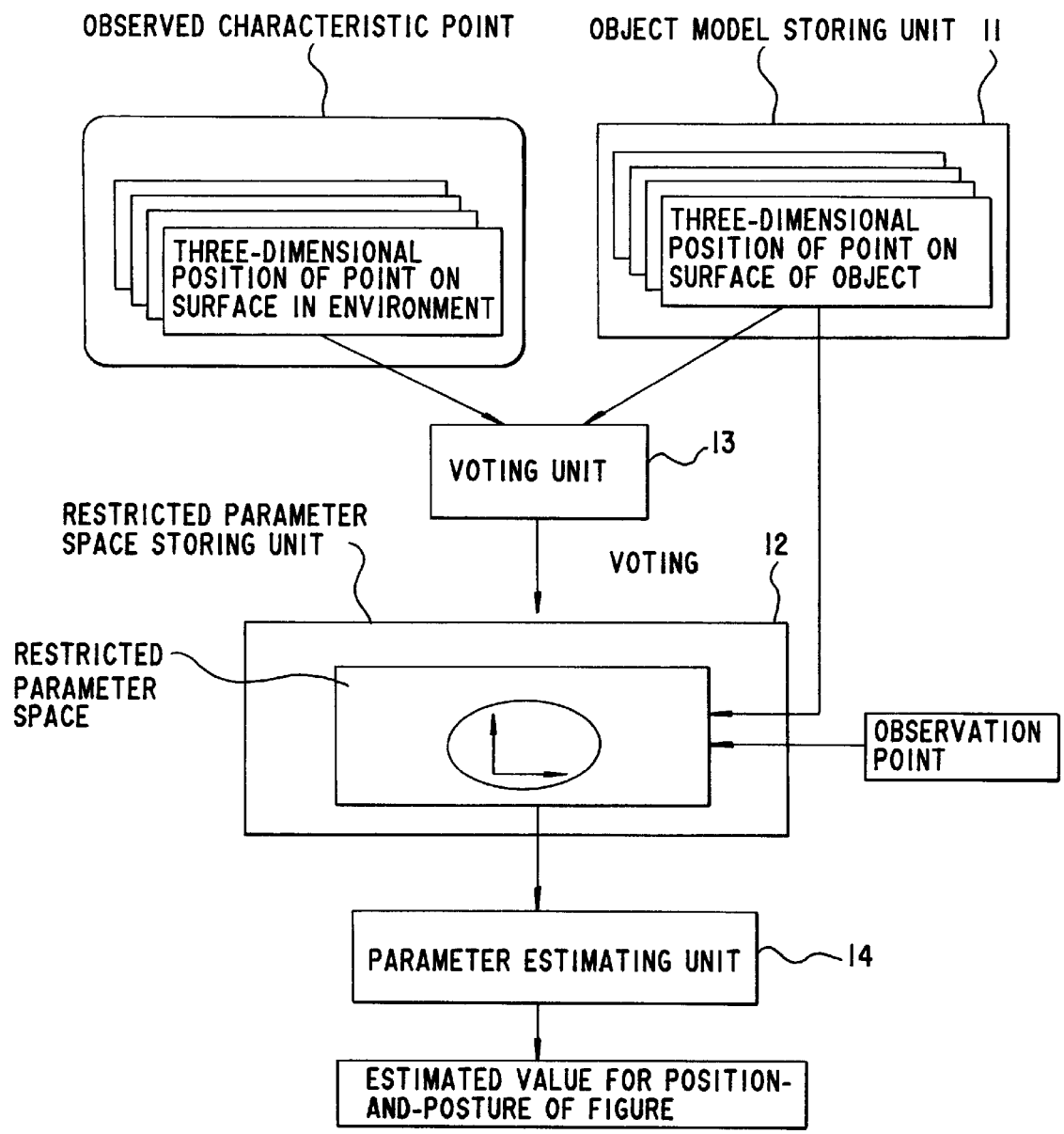
FIG. 28 is a block diagram showing the configuration of the recognizing apparatus according to the third embodiment of the present invention.

Described below is the third embodiment of the present invention. According to the third embodiment, the position-and-posture parameter of a specified object K is estimated from the environment containing a three-dimensional object. FIG. 28 is a block diagram showing the configuration of the recognizing apparatus according to the third embodiment. For example, the configuration according to the third embodiment is different from the configuration according to the first embodiment shown in FIG. 12 in that the object model storing unit 11 stores the three-dimensional position of a point on the surface of an object as the shape information about the object, that an observed characteristic point represents a three-dimensional position of a point on the surface of an object in the environment, and that the parameter estimating unit 14 outputs an estimated value of the position-and posture of a three-dimensional object.

The object model according to the third embodiment is realized by a set of characteristic points on the surface of an object. Thus, an object of an optional form can be modelled within the range of the quantization precision of a characteristic point. The object model M of an object K can be represented by the three-dimensional position coordinate of the object model coordinate system of $N_M$ points on the surface of the object K, that is, by the following equation:

$$(x_j^M) = (x_j^M, y_j^M, z_j^M) \ (j=1 \ldots N_M) \quad (23)$$

The position-and-posture parameter of the object K is a coordinate transformation parameter from the object model coordinate system of the object K to the working coordinate system virtually set in the environment, and is represented by a three-dimensional position and three-dimensional posture, that is, by the following expression "(X,Y, Z, θ)", wherein θ represents the posture of the object K and has a three-dimensional component using, for example, a Euler's angle.

The object of the recognizing apparatus according to the third embodiment is to estimate a position-and-posture parameter of the object K positioned in the environment. In detail, the recognizing apparatus estimates a position-and-posture parameter of the object K containing an observation point specified from the environment among the points on the surface.

An observed characteristic point refers to a characteristic point forming part of the surface of an object obtained by observing an environment using a range finder or through a sterographic view. In this case, the observed characteristic point is represented by a position (in three dimensions) and $N_D$ observed characteristic points are represented by the following equation through the three-dimensional position coordinate of the working coordinate system set in the environment:

$$x_i^D = (x_i^D, y_i^D, z_i^D,) \quad (i=1 \ldots N_D) \tag{24}$$

Figure 29:
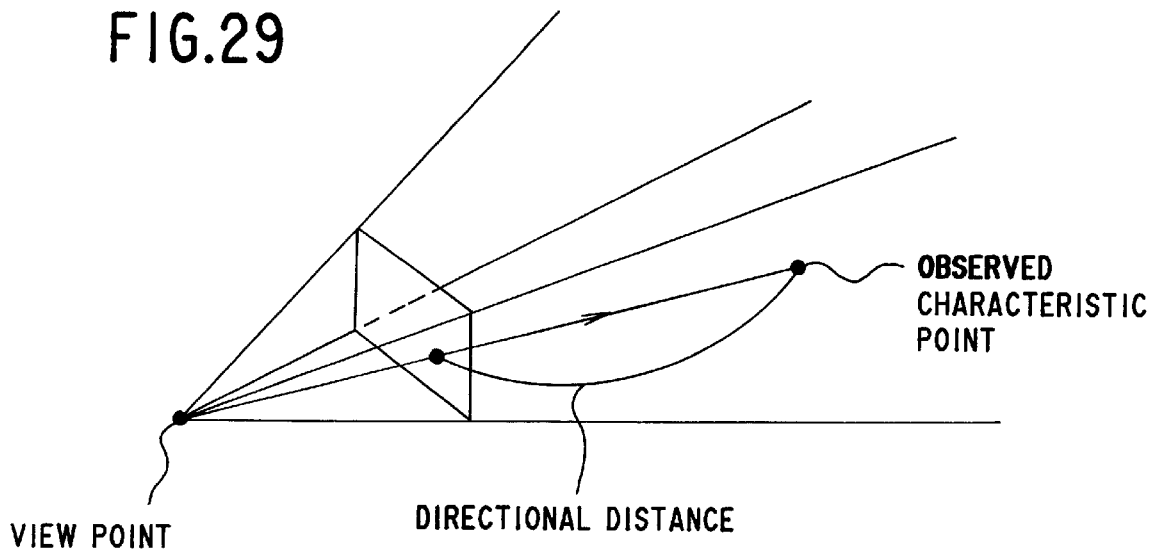
FIG. 29 shows the method of observing the characteristic point using a range-finder.
Figure 30:
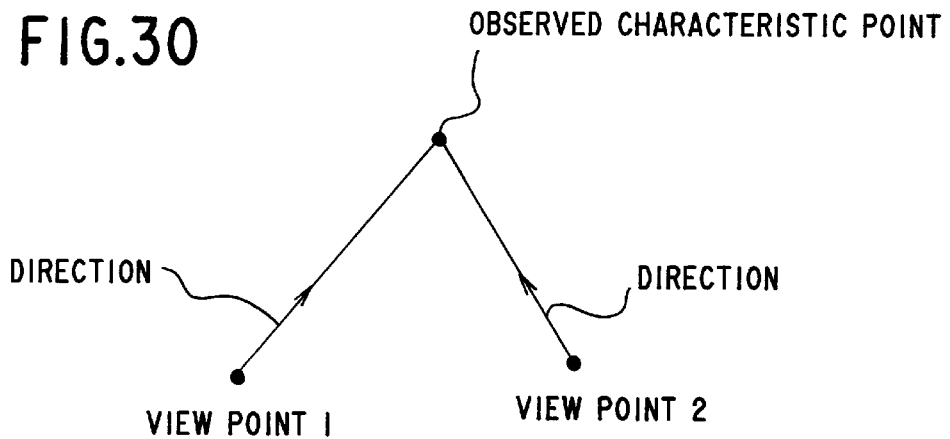
FIG. 30 shows the stereographic method for observing the characteristic point.

The observation of the characteristic points using a range finder or through a sterographic view is described by referring to FIGS. 29 and 30. FIG. 29 shows the method of observing the characteristic points using a range finder. The range finder is used to measure the distance between a view point and an observed characteristic point, and to determine the direction. Therefore, the position of the observed characteristic point can be obtained as shown in the figures.

FIG. 30 shows a sterographic view. The position of the observed characteristic point is obtained according to the triangulation by measuring the directions of an observed characteristic point from two viewpoints.

Described below is the generation of a restricted parameter space. First, the position of an observation point vector $x^A$, that is, the position in the working coordinate system set in the environment, is set to $(x^A, y^A, z^A)$.

The restricted parameter space storing unit 12 generates a restricted parameter space according to an object model and an observation point when the system is initialized. The restricted parameter space C is a set of position-and-posture parameters of an object whose observation point is a surface and whose shape is the same as that of the object K. The relationship among the representative point vector $x^M$, observation point vector $x^A$ of an object model, and the representative point (vector $x^C, \Theta^C$)=$(x^C, y^C, z^C, \Theta^C)$ of the restricted parameter space C is represented by the following equation using the rotation operator $R_\Theta$ from the coordinate transformation equation:

$$x^C = x^A - R_{\Theta^C} x^M \tag{25}$$

Described below is a Euler's angle and a rotation operator $R_\Theta$. In this example, the representations of a roll, pitch, and yaw as an example of representing the Euler's angle. In this representation, the posture of the coordinate axis is represented as a result of three sequential rotations performed on the reference coordinates axis. First, the yaw (angle $\psi$) is defined as a rotation around the x axis. Then, a pitch (angle $\theta$) is defined as a rotation around the y axis. Next, a roll (angle $\phi$) is defined as a rotation around the z axis. With the representation, the posture $\Theta$ is represented by $\Theta=(\psi, \theta, \phi)$. The above-described rotation operator $R_\Theta$ is computed by the following equation:

$$R_\Theta = R(\psi, \theta, \phi) \tag{26}$$

$$= \begin{bmatrix} \cos\phi\cos\theta & \cos\phi\sin\theta\sin\phi - \sin\phi & \cos\phi \\ \sin\phi\cos\theta & \sin\phi\sin\theta\sin\phi + \cos\phi & \cos\phi \\ -\sin\theta & \cos\theta\sin\phi & \end{bmatrix}$$

$$\begin{bmatrix} \cos\phi\sin\theta & \cos\phi + \sin\phi & \sin\phi \\ \sin\phi\sin\theta & \cos\phi - \cos\phi & \sin\phi \\ \cos\theta & \cos\phi & \end{bmatrix}$$

Therefore, the restricted parameter space C is represented by the following equation (29) using the representative point of the object model M and the representative point of the posture parameter.

$$C = \{(x^A - R_{\Theta_k^C} x_i^M, \Theta_k^C) \mid i=1 \ldots N_M, k=1 \ldots N_\Theta\} \tag{27}$$

Therefore, the voting space in the restricted parameter space is discretely represented by the two-dimensional array $$\{H(i,k) \mid i=1 \ldots N_M, k=1 \ldots N_\Theta\} \tag{28}$$

where $N_M$ indicates the number of representative points of the object model, $N\theta$ indicates the quantization number of the posture parameter. Since the representative points of an object model cover the surface of an object, the representative points of an object model are assumed to be extended to a two-dimensional space, the posture parameter is assumed to be extended to a three-dimensional space, therefore the restricted parameter space is assumed to be extended to a five-dimensional space.

According to the conventional technologies, the voting space is a six-dimensional array obtained by discretely representing the six-dimensional position-and-posture parameter space. Thus, the present embodiment realizes a substantial reduction of memory requirements.

The voting is performed by the voting unit 13 as follows when the observed characteristic point vector $x_j^D=(x_j^D, y_j^D, z_j^D)$ is given.

The possible set $C_j$ of the position-and-posture parameters generated from the observed characteristic point vector $x_j^D$ and object model M is represented by the following equation according to the concept similar to that for the observation point:

$$C_j = \{(x_j^D - R_{\Theta_k^C} x_i^M, \Theta_k^C) \mid i=1 \ldots N_M, k=1 \ldots N_\Theta\} \\ (j=1 \ldots N^D) \tag{29}$$

The voting unit 13 votes for the intersection between the restricted parameter space C and the possible set $C_j$ by the observed characteristic point vector $x_j^D$.

The determination of intersection is made by comparing the distance between the representative points with the quantization distance. The intersection is determined when the distance between the representative points is smaller than the quantization distance. A vote is cast by setting the two-dimensional coordinate (i, k) indicating the representative point of the C intersecting with $C_j$ to the following equation:

$$H(i,k) := H(i,k) + 1 \tag{30}$$

After the voting unit 13 has voted for all observed characteristic points, the parameter estimating unit 14 selects the representative point that has obtained the largest number of votes from among the representative points in the restricted parameter space, and defines the position-and-posture as an estimated value of a parameter.

Described below are the number of dimensions of the restricted parameter space and voting space according to the third embodiment, and the reduction of the memory requirements. For example, according to the first embodiment, the original parameter space is a total of three dimensions (two-dimensional position and one-dimensional posture). The restricted parameter space is a total of two dimensions (one-dimensional freedom of an object model and one-dimensional freedom of a posture).

According to the third embodiment, the original parameter space is a total of six dimensions (a three-dimensional position and a three-dimensional posture) because the environment has changed from a two-dimensional space to a three-dimensional space. The equation of the restricted parameter space C is similar to equation (6) of the first embodiment. However, the numbers of dimensions for i and k as indices are different between the embodiments.

The i is an index indicating the representative point of an object model. In the third embodiment, the representative point indicates a point covering the surface of an object, and the index i is assumed to be a substitute number for an originally two-dimensional index. The k is an index indicating the representative point of a posture. Since the Euler's angle is represented by three numbers, the index k is assumed to be a substitute number for an originally three-dimensional index. Therefore, the restricted parameter space is represented in five dimensions in the third embodiment.

On the other hand, the number of dimensions of the voting space is equal to the number of dimensions of the restricted parameter space. The voting space in the third embodiment is represented in five dimensions. In the above descriptions, the voting space is represented by H (i, k) and seems to be a two-dimensional array. However, since i and k are assumed to be respectively a two-dimensional index and a three-dimensional index, the voting space represented by H (i, K) is also represented by five dimensions.

Thus, according to the third embodiment, the original parameter space is represented by six dimensions and the voting space is represented in five dimensions, thereby reducing the memory requirements by a one-dimension capacity. The quantization number for one dimension is about 100 through 1000, and the memory capacity can be reduced to 1/100 through 1/1000. This is an important step to a successful realization of a recognizing apparatus.

Described finally is the fourth embodiment of the present invention. According to the fourth embodiment, the position-and-posture parameter of the object K specified from the environment containing a three-dimensional object is estimated as in the third embodiment. However, this embodiment is different from the third embodiment in that the surface normal of an object is used as shape information.

Figure 31:
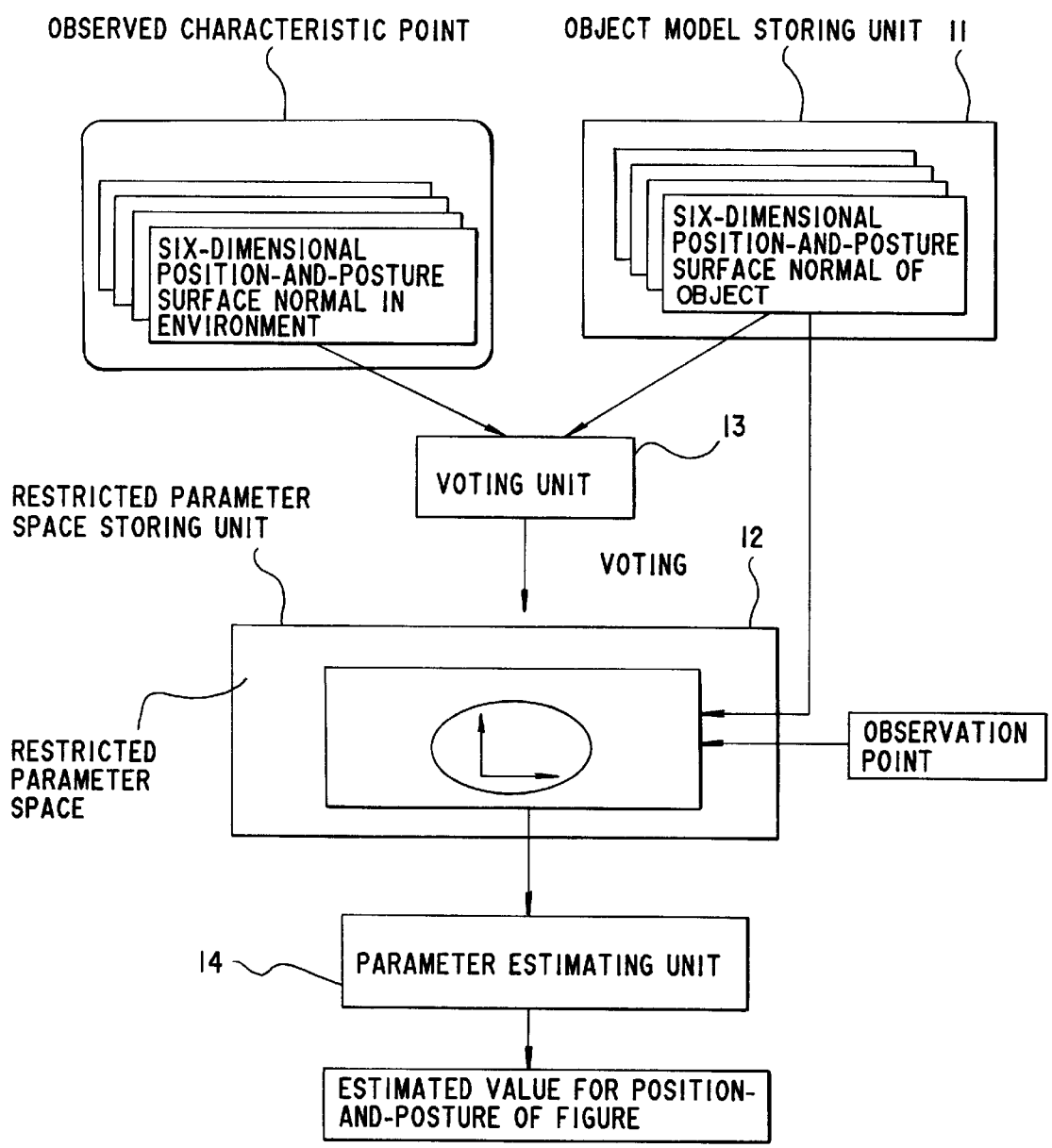
FIG. 31 is a block diagram showing the configuration of the recognizing apparatus according to the fourth embodiment of the present invention.

FIG. 31 is a block diagram showing the configuration of the recognizing apparatus according to the fourth embodiment. The configuration according to the fourth embodiment is different from the configuration according to the third embodiment shown in FIG. 28 in that the object model storing unit 11 stores the six-dimensional position-and-posture of a surface normal of an object as shape information about an object model, and that the observed characteristic point indicates a six-dimensional position-and-posture of a surface normal in the environment.

That is, the surface normal of an object is used as shape information according to the fourth embodiment. The surface normal starts at a point on the surface of the object, and refers to the normal vertical to the surface. An object model is represented by a set of surface normals covering the surface of the object at a certain density. The surface normal is quantitatively represented as a total volume of six dimensions of the three-dimensional position coordinate of the start point of the surface normal and the three-dimensional posture of the normal.

The object model according to the fourth embodiment is represented by a set of observed characteristic points that are the surface normal of an object. Thus, an object of an optional shape can be modelled in a range of the quantization precision of a characteristic point. An object model M of an object K can be represented by the three-dimensional position coordinate in the object model coordinate system and the three-dimensional posture coordinate, such as a Euler's angle, indicating the position-and-posture of each of the $N_M$ surface normals of the object K, that is, $$(x_j^M, \Theta_j^M) = (x_j^M, y_j^M, z_j^M, \Theta_j^M)(j=1 \ldots N_M) \quad (31)$$

The position-and-posture parameter of the object K is a coordinate transformation parameter from the object model coordinate system of the object K to the work coordinate system virtually set in the environment, and is represented by the three-dimensional position and three dimensional posture, that is, "(X,Y, Z, $\Theta$)" where $\Theta$ indicates the posture of the object K and has components of three dimensions, for example, a use of an Euler's angle.

The object of the recognizing apparatus according to the fourth embodiment is to estimate a position-and-posture parameter of the object K arranged in the environment. In detail, a position-and-posture parameter of the object K containing an observation point as a part of the surface normals is estimated when one of the surface normals obtained as the observation point in the environment is specified.

An observed characteristic point refers to an object surface normal obtained by obtaining a distance image after observing the environment using a range finder or through a stereographic view. At this time the observed characteristic point is represented by a position (three-dimensional) and posture (three-dimensional). $N_D$ observed characteristic points are represented as follows using the work coordinate system set in the environment and the six-dimensional position-and-posture coordinate:

$$(x_i^D, \Theta_i^D) = (x_i^D, y_i^D, z_i^D, \Theta_i^D)(i=1 \ldots N_D) \quad (32)$$

Assume that the position-and-posture in the work coordinate system set in the environment of an observation point vector $x^A$ is $(x^A, y^A, z^A, \Theta^A)$.

The restricted parameter space storing unit 12 generates a restricted parameter space according to an object model and an observation point when the system is initialized. The restricted parameter space C is a set of position-and-posture parameters of an object whose observation point is a surface normal and whose shape is the same as that of the object K. The relationship among the representative points (vector $x^M$, $\Theta^M$), observation points (vector $x^A$, $\Theta^A$) of an object model, and the representative point (vector $x^C$, $\Theta^C$)=($x^C$, $y^C$, $z^C$, $\Theta^C$) of the restricted parameter space C is represented by the following equation using the rotation operator $R_\Theta$ from the coordinate transformation equation.

$$\left.\begin{array}{r}x^C = X^A - R_\Theta C x^M \\ R_{\Theta A} = R_{\Theta C} R_{\Theta M}\end{array}\right\} \quad (33)$$

Therefore, the restricted parameter space C is extended to three-dimensional space comprising a two-dimensional freedom of the object model M and a one-dimensional freedom of a posture parameter. The voting space can be discretely represented by a three-dimensional array.

According to the conventional technologies, the voting space is a six-dimensional array obtained by discretely representing the six-dimensional position-and-posture parameter space. Thus, the present embodiment realizes a substantial reduction of memory requirements.

The voting is performed by the voting unit 13 and a parameter is estimated by the parameter estimating unit 14 as in the first through third embodiments.

Figure 32:
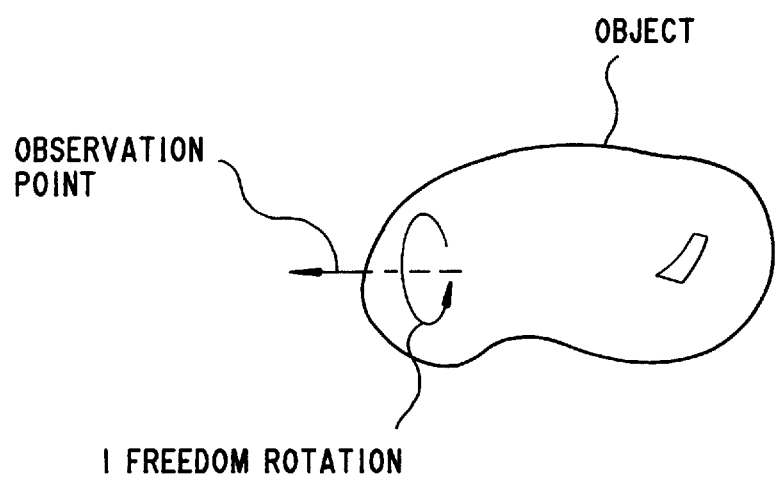
FIG. 32 shows the rotation of an object around the observation normal according to the fourth embodiment of the present invention.

According to the fourth embodiment, an observation point, that is, an observation surface normal, has position-and-posture information. Assuming that a representative point of an object corresponds to the observation point, the freedom of an object has a freedom of a rotation around an observation normal as shown in FIG. 32. Since the representative point on the surface of an object has two freedoms. Therefore, the restricted parameter space has a total of 3 freedoms, and the voting space has also a three-dimensional freedom.

As described above, an environment description parameter can be correctly estimated according to the present invention even if the information about the observed characteristic point of an object to be recognized is lost by noises and covers, or wrong and redundant information is included. Furthermore, compared with the conventional system, the memory requirements in representing a parameter space can be substantially reduced according to the present invention. Therefore, a strict recognizing system capable of operating with practical memory requirements even under uncertain conditions of the environment can be produced, thereby considerably improving the object recognizing technology.

It is to be understood that the aforementioned embodiments are merely illustrative of the principles of the present invention. Various modifications and changes may be made thereto by those skilled in the art which will employ the principles of the present invention and fall within the spirit and scope thereof.

What is claimed is:

1. A strict recognizing apparatus implemented on a computer using an observation point in estimating a parameter describing an environment using a set of characteristic points obtained by observing the environment and an object model implying shape information of an object assumed to exist in the environment, comprising:

restricted parameter space storing means for storing a restricted parameter space as a space in the parameter generated based on the object model and restricted by predetermined observation point information corresponding to the shape information about the object model;

voting means for voting for a subset of parameters matching the object model in each of the characteristic points in the restricted parameter space; and parameter estimating means for outputting an estimated value of the parameter describing the environment corresponding to a voting result for a voting space in the restricted parameter space after taking votes for all of the characteristic points.

2. The strict recognizing apparatus according to claim 1, further comprising:

object model storing means for storing the shape information for the object model and outputting the shape information to said restricted parameter space storing means and said voting means.

3. The strict recognizing apparatus according to either claim 1 or 2, wherein said shape information about the object model is a set of position coordinates of outline points of a two-dimensional object; and wherein said observation point information refers to an optional position coordinate of the outline points.

4. The strict recognizing apparatus according to claim 1 or 2, wherein said shape information about the object model consists of a set of position-and-postures of the outline normals of a two-dimensional object; and wherein said observation point information refers to an optional position-and-posture of the outline normals.

5. The strict recognizing apparatus according to claim 1 or 2, wherein said shape information about the object model is a set of position coordinates of surface points of a three-dimensional object; and wherein said observation point information refers to an optional position coordinate of the surface points.

6. The strict recognizing apparatus according to claim 1 or 2, wherein said shape information about the object model is a set of position-and-postures of normals on a surface of a three-dimensional object; and wherein said observation point information refers to an optional position-and-posture of the normals on the surface.

7. The strict recognizing apparatus according to claim 1 or 2, wherein said estimated value of the parameter output by said parameter estimating means consists of an estimated value of position coordinates of a center of gravity of the object.

8. The strict recognizing apparatus according to claim 1 or 2, wherein said estimated value of the parameter output by said parameter estimating means consists of an estimated value of a position-and-posture of the object as a transformation parameter from an object model coordinate system for the object into a work coordinate system set in the environment.

9. A method for estimating a parameter describing an environment using a set of characteristic points obtained by observing the environment and an object model implying shape information of an object assumed to exist in the environment, including a computer-readable storage medium and a computer, comprising the steps of:

storing a restricted parameter space as a space in the parameter generated based on the object model and restricted by predetermined observation point information corresponding to the shape information about the object model;

storing a voting space in which a vote is taken for a subset of parameters as matching the object model in each of the characteristic points in the restricted parameter space; and outputting an estimated value of the parameter describing the environment corresponding to a voting result for a voting space in the restricted parameter space after taking votes for all of the characteristic points.

10. A strict recognizing method implemented on a computer using an observation point in estimating a parameter describing an environment using a set of characteristic points obtained by observing the environment and an object model implying shape information of an object assumed to exist in the environment, comprising the steps of:

storing a restricted parameter space as a space in the parameter generated based on the object model and restricted by predetermined observation point information corresponding to the shape information about the object model;

voting for a subset of parameters as matching the object model in each of the characteristic points in the restricted parameter space; and outputting an estimated value of the parameter describing the environment corresponding to a voting result for a voting space in the restricted parameter space after taking votes for all of the characteristic points.

* * * * *